(12) United States Patent
Rao

(10) Patent No.: US 8,977,569 B2
(45) Date of Patent: Mar. 10, 2015

(54) SYSTEM AND METHOD FOR PROVIDING SMART ELECTRONIC WALLET AND RECONFIGURABLE TRANSACTION CARD THEREOF

(76) Inventor: Raj Rao, Newport Coast, CA (US)

(*) Notice: Subject to any disclaimer, the term of this patent is extended or adjusted under 35 U.S.C. 154(b) by 0 days.

(21) Appl. No.: 13/585,585

(22) Filed: Aug. 14, 2012

(65) Prior Publication Data
US 2014/0006277 A1 Jan. 2, 2014

Related U.S. Application Data

(60) Provisional application No. 61/540,977, filed on Sep. 29, 2011.

(51) Int. Cl.
*G06Q 40/00* (2012.01)

(52) U.S. Cl.
USPC .......................................................... 705/41

(58) Field of Classification Search
CPC .......... G06Q 20/3552; G06Q 20/3574; G06Q 20/3576; G06Q 20/3829; G06Q 20/383; G06Q 20/385; G06Q 20/4014; G06Q 20/4037; G06Q 20/405; G06Q 20/102; G06Q 20/1085; G06Q 20/18; G06Q 20/227; G06Q 20/24; G06Q 20/325; G06Q 20/327; G06Q 20/3278; G06Q 20/342; G06Q 20/346; G06Q 20/3674; G06Q 20/425; G06Q 20/023; G06Q 20/06; G06Q 20/3223; G06Q 20/3255; G06Q 20/3276; G06Q 20/351; G06Q 20/352; G06Q 20/355; G06Q 20/3558; G06Q 20/357; G06Q 20/367; G06Q 20/3672; G06Q 20/3821; G06Q 20/388; G06Q 20/40975; G06Q 30/0238; G06Q 30/06; G06Q 30/04; G06Q 30/0601; G06Q 30/00; G06Q 40/025; G06Q 40/00; G06Q 40/02
See application file for complete search history.

(56) References Cited

U.S. PATENT DOCUMENTS

| | | | |
|---|---|---|---|
| 4,868,376 A | 9/1989 | Lessin et al. | |
| 5,955,961 A | 9/1999 | Wallerstein | |
| 6,024,286 A | 2/2000 | Bradley et al. | |
| 6,131,811 A | 10/2000 | Gangi | |
| 6,315,195 B1 | 11/2001 | Ramachandran | |
| 6,336,586 B1 | 1/2002 | Shriver | |
| 6,353,811 B1 | 3/2002 | Weissman | |

(Continued)

FOREIGN PATENT DOCUMENTS

WO 2012/084497 A1 6/2012

OTHER PUBLICATIONS

Mjølsnes et al., "On-Line E-Wallet System with Decentralized Credential Keepers", Mobile Networks and Applications 8, 87-99 (2003).*

(Continued)

*Primary Examiner* — Virpi Kanervo
(74) *Attorney, Agent, or Firm* — Rosenberg, Klein & Lee

(57) ABSTRACT

A smart electronic wallet with reconfigurable multiple-account transaction card is provided. The system and method provide measures for storing a plurality of account identifiers from a plurality of traditional single-use transaction cards into a storage memory in a smart wallet. The system and method also provide for storing a reconfigurable multiple-account transaction card within the smart electronic wallet and allowing for it to be dynamically and selectively reconfigured for any one of the plurality of account identifiers stored within the smart electronic wallet. Additionally, a consumer is able to initiate a transfer or trade of transaction cards across different smart electronic wallet devices.

13 Claims, 23 Drawing Sheets

(56) References Cited

U.S. PATENT DOCUMENTS

| | | |
|---|---|---|
| 6,631,849 B2 | 10/2003 | Blossom |
| 6,695,215 B2 | 2/2004 | Robertson |
| 6,715,679 B1 | 4/2004 | Infosino |
| 6,732,919 B2 | 5/2004 | Macklin et al. |
| 7,206,769 B2 | 4/2007 | Laurent et al. |
| 7,591,416 B2 | 9/2009 | Blossom |
| 7,784,692 B1 | 8/2010 | Arrington, III |
| 8,070,055 B2 | 12/2011 | Block et al. |
| 8,401,904 B1 * | 3/2013 | Simakov et al. ............... 705/16 |
| 2005/0240528 A1 | 10/2005 | Hendrick |
| 2008/0017704 A1 | 1/2008 | VanDeburg et al. |
| 2008/0126260 A1 | 5/2008 | Cox et al. |
| 2009/0006646 A1 | 1/2009 | Duarte |
| 2010/0030698 A1 * | 2/2010 | Goodin .......................... 705/76 |
| 2011/0047074 A1 | 2/2011 | Cai |
| 2011/0173121 A1 * | 7/2011 | Kawan ........................... 705/41 |
| 2011/0180598 A1 | 7/2011 | Morgan et al. |
| 2011/0272479 A1 * | 11/2011 | Mullen ....................... 235/492 |
| 2011/0294418 A1 | 12/2011 | Chen |
| 2012/0041815 A1 | 2/2012 | Gangi |

OTHER PUBLICATIONS

Labrou et al., Wireless Wallet, Proceedings of the First Annual International Conference on Mobile and Ubiquitous Systems: Networking and Services (MobiQuitous'04), IEEE (2004).*

Qi et al., Secure Mobile payment via Trusted Computing, Third Asia-Pacific Trusted Infrastructure Technologies Conference, IEEE (2008).*

Ergeerts et al., Vision Towards an Open Electronic Wallet on NFC Smartphones, International Journal on Advances in Internet Technology, vol. 5, No. 3 & 4, pp. 84-94 (2012).*

Communication From PCT US/RO Regarding A Counterpart PCT Application Dated Apr. 18, 2014.

* cited by examiner

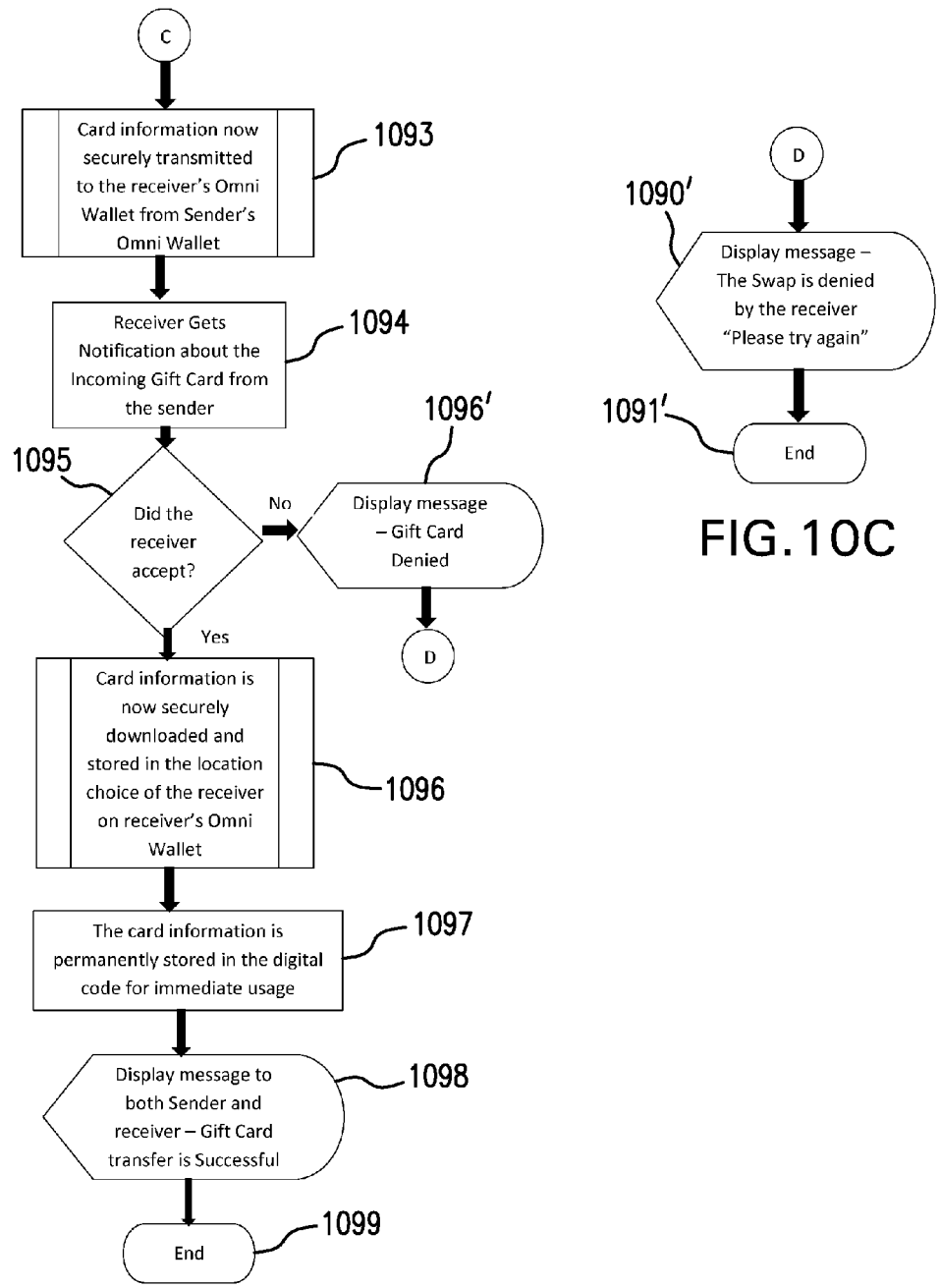

SYSTEM AND METHOD FOR PROVIDING SMART ELECTRONIC WALLET AND RECONFIGURABLE TRANSACTION CARD THEREOF

RELATED APPLICATIONS

This application is based on Provisional Patent Application Ser. No. 61/540,977, filed 29 Sep. 2011, currently pending.

BACKGROUND OF THE INVENTION

The subject system and method are generally directed to establishing a smart electronic wallet equipped with a reconfigurable transaction card therefor. More specifically, the subject system and method are directed to providing a smart wallet which is able to capture account numbers and other information encoded on, for example: credit cards or other encoded cards and instead provide a single-reconfigurable transaction card in their place to dramatically reduce the number of cards or other such account, access, validation, or value bearing transaction devices a consumer is obliged to carry.

Today, consumers carry many extraneous instruments in their wallet which may include credit cards, gift cards, debit cards, reward cards, insurance cards, access cards, stored value cards, transportation cards, identity cards, and the like (interchangeably referred to herein as "transaction cards" or "transaction devices"). With the staggering number of different transaction cards carried, the size of a wallet or purse tends to be unnecessarily bloated and uneven wear is exerted on the wallet and a containing pocket or purse. The additional weight and bulk may pose postural or ergonomic risks, especially if the wallet is carried in a pocket, such as a pinched sciatic nerve, lower back pain, and contribute to a general feeling of uncomfortableness—especially while sitting. Moreover, carrying so much personal information, credentials, and cards allows for intrusion by any person gaining access to the physical wallet to also access the transaction cards (and encoded information) contained therein. Each traditional single-use transaction card, in addition to the minimally needed account number, may also maintain a trove of personal data thereon including a card-holder's name, billing address, pin-number, and the like. This leads to a less than ideal situation where an inefficiently heavy and large wallet or purse is carried around to provide storage for all of these transaction cards that each have duplicative and unnecessary personal information thereon.

Aside from the inconvenience of a large wallet or purse, so much readily-accessible information may unduly expose the owner of a lost wallet to identity theft. Further, in the event a wallet is lost or stolen, an owner must go through the trouble of enumerating each and every card contained therein and contact all of the issuers (usually within 24 hours) to cancel the cards—or be held responsible (potentially even financially) for their fraudulent use. Still further, with certain services having recurring payments being tied to specific card numbers, not only must the owner contact the card-issuers, but often times, the owner must also contact any service providers billing to the lost card numbers—or suffer refused transaction penalties.

There is therefore a need for a system and method for providing a secure, compact, light-weight smart wallet system equipped with one or more reconfigurable transaction cards.

There is therefore a need for a system and method which allow for carrying a reconfigurable card in place of a plurality of single-use transaction cards.

There is therefore a need for a system and method for establishing authentication measures to restrict access to various transaction cards and the personal information stored thereon.

There is a need for a system and method for facilitating an on-line or virtual exchange of transaction cards between consumers.

There is a need for a system and method for securing the flow of private information contained on transaction cards.

SUMMARY OF THE INVENTION

It is an object of the present invention to provide a system and method for providing a secure, compact, light-weight smart wallet system equipped with one or more reconfigurable transaction cards.

It is an object of the present invention to provide a system and method which allow for the carrying of a reconfigurable card in place of a plurality of single-use transaction cards.

It is an object of the present invention to provide a system and method for establishing authentication measures to restrict access to various transaction cards and the personal information stored thereon.

It is an object of the present invention to provide a system and method for facilitating an on-line or virtual exchange of transaction cards between consumers.

It is an object of the present invention to provide a system and method for securing the flow of private information contained on transaction cards.

A system realized in accordance with the present invention includes a portable system for electronically emulating a wallet and account-bearing transactional card contents. A portable wallet body defines at least one compartment removably storing at least one proxy card within the portable wallet body. The proxy card is electronically reconfigurable to selectively emulate at least one of a plurality of predetermined account bearing transaction cards. A transaction card interface unit is disposed within the wallet body and includes a user interface portion and a card encoding portion coupled to the user interface portion. The card encoding portion is actuated responsive to the user interface portion to selectively encode account data onto the proxy card. The account data corresponds to at least one of the predetermined account-bearing transaction cards. The proxy card is thereby readable in substantially identical manner as selected ones of the predetermined account-bearing transaction cards.

Another system realized in accordance with the present invention includes a reconfigurable transaction proxy card which selectively encodes at least one of a plurality of account identifiers for emulating a wallet and account-bearing transactional cards. A transaction-terminal interface unit is disposed in a substrate and selectively encodes at least an account identifier corresponding to at least one of a plurality of predetermined account-bearing transaction cards. The transaction-terminal interface unit is thereby readable in substantially identical manner as selected ones of the predetermined account-bearing transaction cards. A storage memory is disposed in the substrate, the storage memory stores at least a secondary account information related to the account identifier. A controller is disposed in the substrate and coupled to the storage memory. The controller selectively retrieves at least the secondary account information related to the account identifier from the storage memory. An electronic display is disposed on the substrate and is coupled to the controller and the storage memory for displaying the retrieved secondary account information relating to the account identifier corresponding to a predetermined account-bearing transaction card encoded on the transaction-terminal interface unit.

A method realized in accordance with the present invention comprises electronically emulating a physical transfer of transaction cards across an online enterprise. A smart wallet is established to include a card interface unit configured to read and write contents of transaction cards and a storage memory coupled to the card interface unit. The storage memory is configured to store a first account token captured from at least one of a plurality of transaction cards and a second account token to be written to a reconfigurable transaction proxy card. A network communications unit is coupled to the storage memory. A first account token is captured from a first transaction card via the card interface unit into the storage memory. The first account token is transmitted to an external enterprise via the network communication unit. The second account token is received from the external enterprise via the network communication unit. The card interface unit is then actuated to write the second account token onto a reconfigurable transaction proxy card; the reconfigurable transaction proxy card is thereby readable in substantially identical manner as selected ones of the plurality of transaction cards.

Additional aspects and utilities of the present general inventive concept will be set forth in part in the description which follows, and, in part, will be apparent from the description, or may be learned by practice of the general inventive concept.

BRIEF DESCRIPTION OF THE DRAWINGS

FIG. 10B is a continuation of the flow diagram of FIG. 10A;

FIG. 10C is a continuation of the flow diagram of FIGS. 10A and 10B;

DETAILED DESCRIPTION OF THE PREFERRED EMBODIMENTS

One example of a system and method realized in accordance with the present invention seeks to dramatically reduce the size of a wallet, the number of transaction cards required to be carried for a given consumer, and increase the security of the individual holder of the transaction cards. Another example of the system and method realized in accordance with the present invention seeks to facilitate a secure virtual exchange of transaction cards across a network communication infrastructure.

Figure 1:
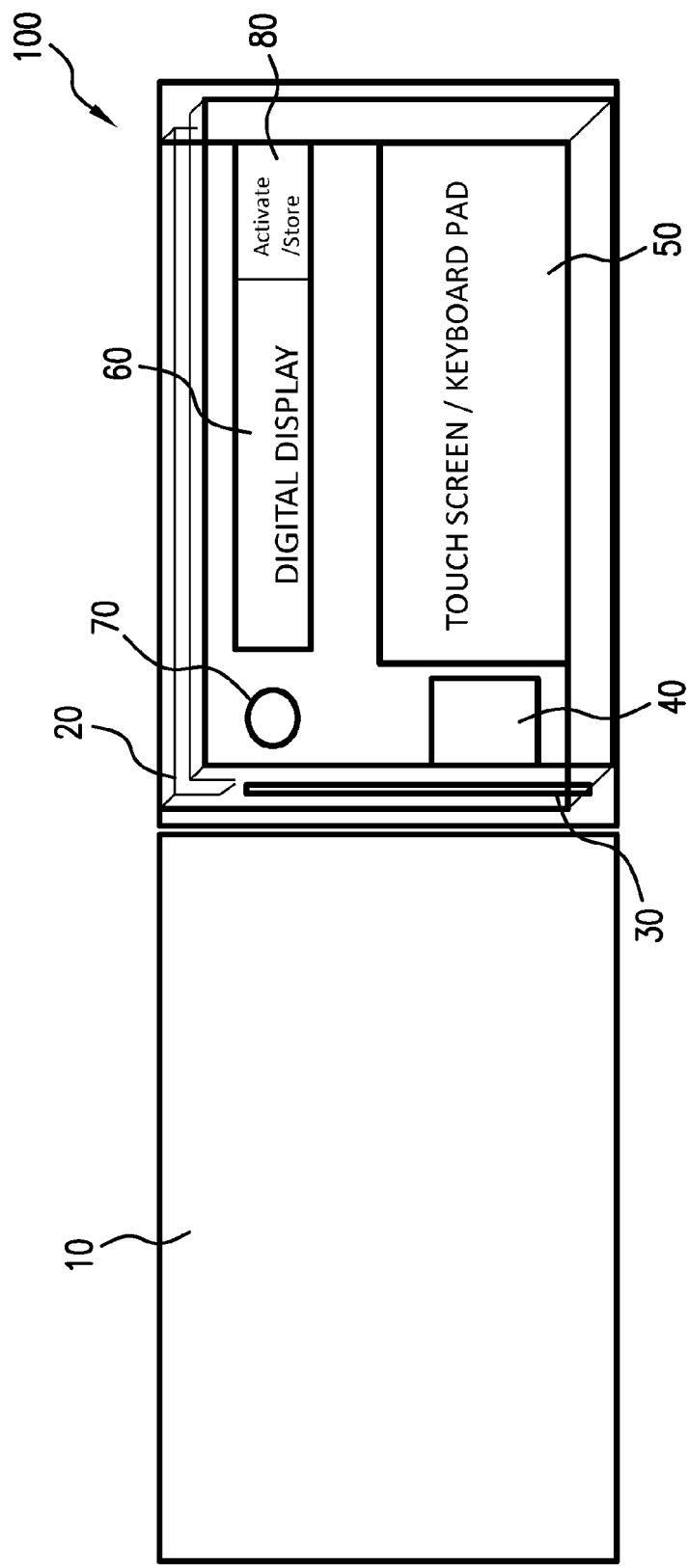
FIG. 1 is a simplified schematic diagram illustrating certain features of a smart electronic wallet system formed in accordance with one exemplary embodiment of the present invention.

As seen in the illustrative diagram of FIG. 1, a smart wallet 100 includes a jacket 10 which encompasses an electronic body portion of the smart wallet 100. The jacket 10 may be any material known to one of skill in the art—for example: leather, cloth, polymer-based synthetic material, or any material suitable to mechanically protect the smart wallet. Preferably, the jacket 10 is sealable along its edges to thereby retainably capture the smart wallet 100 within a weatherproof/weather resistant enclosure. Such weatherproof enclosure jacket 10 is preferably dust, water, and shock resilient or proof while still allowing the smart wallet to retain a svelte, compact form-factor.

In a preferred embodiment, jacket 10 suitably emulates the look of a conventional wallet to make the smart wallet indistinguishable (aside from the relative thinness thereof) from a traditional wallet. The smart wallet 100 contains a card interface unit 20 which may include a magnetic reader, a magnetic strip writer, a smart card reader, a near field communication (NFC)/radio frequency identification (RFID), bar code reader, a camera, and the like. The magnetic reader and writer may be combined as a singular magnetic transducer or be split into two different heads. Additionally, a dedicated magnetic strip eraser in the form of a permanent magnet being mechanically displaceable or a solenoid may be employed. Transaction card interface unit 20 may employ any interfacing technology known to one of skill in the art. However, throughout the disclosure, the transaction card interface unit 20 will be primarily referred to as a magnetic card reader/writer for convenience and clarity purposes.

In the exemplary embodiment illustrated, the smart wallet 100 includes a keyboard, touch screen, and/or any other suitable user interface 50 for allowing a user to interact with the smart wallet. A digital display 60 may display information to a user and/or interact with the user. An additional button or buttons 80 preferably allows a user quick access to certain predefined features such as activating or storing an account identifier retrieved from a standard transaction card.

Additionally, as the smart wallet 100 may contain a plurality of account identifiers and other personal information harvested from a plurality of conventional transaction cards, a series of user authentication measures may be provided such as a fingerprint reader 40 and/or a retinal scanner 70. Other biometric or knowledge-based authentication measures may be employed as well, such as facial recognition, password, pin-code, or a physical key.

A receiving chamber 30 is preferably defined in the smart wallet 100 to releasably store a reconfigurable transaction card, amongst other cards which may be necessary or desirable to carry. Such additional cards which may be retained by a user may include official graphical identifying documents, such as a picture driver's license, a border crossing document, and any other document which may be rooted in the visual, as opposed to encoded, realm. The reconfigurable transaction card is preferably recharged and/or encoded while stored in the receiving chamber 30.

Figure 2:
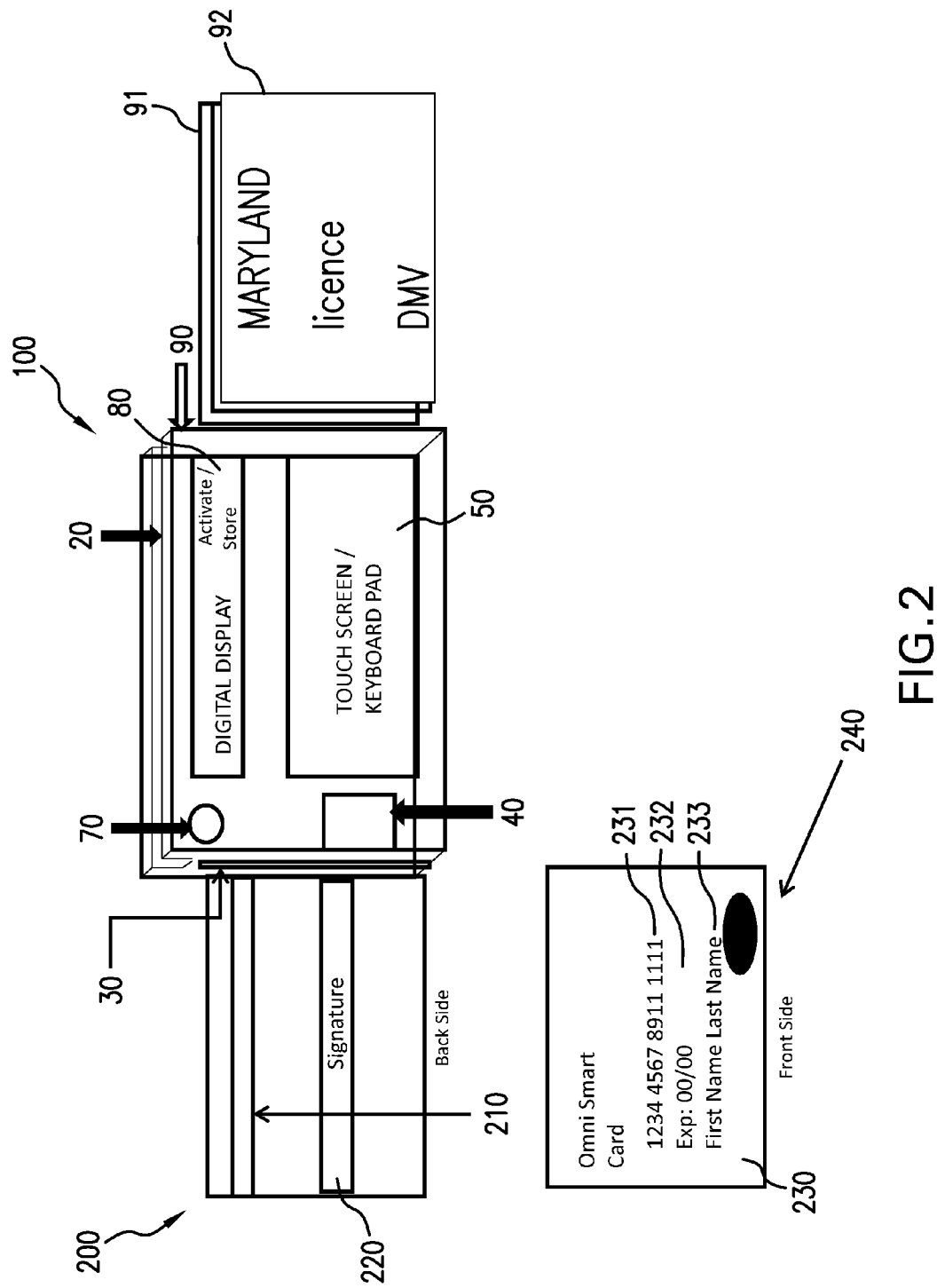
FIG. 2 is a simplified schematic diagram illustrating the system embodiment of FIG. 1 illustrated in use with a reconfigurable transaction card formed in accordance with one exemplary embodiment of the present invention.

The embodiment shown of smart wallet 100 in FIG. 2 includes at least one removable reconfigurable transaction card 200. Smart wallet 100 further includes a transaction card interface unit 20, a retina scanner or camera 70, a fingerprint reader 40, and a keyboard or touch screen 50. Additionally, a secondary cavity for storing additional cards such as a driver's license 92 or a library card 91, is provided. A receiving chamber 30 is defined in smart wallet 100 for a reconfigurable transaction card 200 to be inserted therein and releasably captured. The reconfigurable transaction card 200 in this exemplary embodiment includes on its reverse side an e-ink, LED, OLED, or other such thin-film-based display as a signature line 220. Alternatively, such signature line may be manually signed in permanent ink by a card-holder.

On a front side of the reconfigurable transaction card 200, there is provided a primary display 230 which may display a plurality of different information items such as, for example: a credit card number (or account identifier) 231, an expiration date 232, and a name of the user 233. Additionally, a watermark or symbol acting as a check sum or hashed digest 240 or a hardware identifier may be present as well. The main display 230 on reconfigurable card 200 may enable a human user to know which account is encoded onto the storage medium 210 of the reconfigurable card 200. Such primary display 230 may also be useful for merchants and vendors to visually identify the type of account or card being used.

The storage strip 210 may be, for example, a passive magnetic strip or magnetic tape—preferably of low coercivity to allow for low power writing thereto; however, a high coercivity tape may be employed for a more durable re-writable card at the expense of a bigger writing head and/or more power usage.

A magnetic strip card is capable of storing data by modifying the magnetism of tiny iron-based magnetic particles on a band of magnetic material on the card. The magnetic strip, sometimes referred to as swipe card or magstripe, is read by physical contact and swiping past a magnetic reading head.

A number of International Organization for Standardization (ISO) standards exist defining the physical properties of a magstripe card, including size (generally 3.375" long by 2.125" wide by 0.030" thick), flexibility, location of the magstripe, magnetic characteristics, and data formats. For example, ISO/IEC 7810, ISO/IEC 7811 (7811-1, 7811-2, 7811-3, 7811-4, 7811-5, 7811-6), ISO/IEC 7812, ISO/IEC 7813, ISO 8583, and ISO/IEC 4909, which are all incorporated herein by reference as if set forth explicitly herein.

Generally there are up to three tracks on magnetic cards used for financial transactions: Tracks 1, 2, and 3. Track 3 is generally unused by the major worldwide networks such as VISA, and is often omitted from the magstripe card to allow for a narrower magnetic stripe. Point-of-Sale (POS) readers almost always read Track 1 or Track 2 and sometimes both, in case one track is unreadable. The minimum cardholder account information needed to complete a transaction is included on both tracks. Track 1 is written with code known as DEC SIXBIT plus odd parity. The information on Track 1 for financial cards is contained in several formats: A, which is reserved for proprietary use of the card issuer; B, which is described below; C-M, which are reserved for use by ANSI subcommittee X3B10; and, N-Z, which are available for use by individual card issuers.

Exemplary Format B—Track 1:
Start sentinel—one character (generally '%');
Format code='B'—one character (alpha only);
Primary Account Number (PAN)—up to 19 characters. Usually matches the credit card number printed on the front of the card;
Field Separator—one character (generally '^');
Name—2 to 26 characters;
Field Separator;
Expiration date—four characters in the form YYMM;
Service code—three characters;
Discretionary Data—may include Pin Verification Key Indicator (PVKI, 1 character), PIN Verification Value (PVV, 4 characters), Card Verification Value or Card Verification Code (CVV or CVC, 3 characters)
End sentinel—one character (generally '?');
Longitudinal Redundancy Check (LRC)—one character and a validity character calculated from other data on the track. Most reader devices do not return this value when the card is swiped to the presentation layer, and use it internally to verify the card read.

Track 2 is generally written with a 5-bit scheme including 4 data bits and 1 parity bit allowing for a total of sixteen possible characters which are numbers 0-9 and six control characters: e.g. ": ; < = > ?" which generally correspond to the ASCII hex range of 0x30 to 0x3f.

Exemplary Format B—Track 2:
Start sentinel—one character (generally ';');
Primary Account Number (PAN);
Separator—one character (generally '=');
Expiration date—four characters in the form YYMM;
Service code—three digits specifying interchange rules, authorization processing, and range of services;
Discretionary Data—as in Track 1;
End Sentinel—one character (generally '?');
Longitudinal Redundancy Check (LRC).

The magnetic strip is generally disposed 0.223" (5.664 mm) from the card edge. The magnetic strip is then divided into three longitudinally parallel tracks, each latitudinally occupying 0.110" or 2.794 mm. Track 1 is generally capable of storing 210 bits per inch and encoded with 7 bits per character for a total storage of approximately 79 alphanumeric characters. Track 2 generally is partitioned for 75 bits per inch for a total of 40 numeric characters with 5 bit per character encoding.

Several card types exist, such as: Member Card—which may be encoded, as an example: % MC^xxxxxxx? (where the seven x's are digits padded to the left with 0s); Guest-of-Member-Card: % GM^xxxxxxx?; and Gift Card: % GC^xxxxxxx?. The x numbers must be unique within the Card Type. The numbers are attached or cross-referenced to the appropriate Member, Guest, or Gift Card file or account number upon activation and inherit their respective associations such as expiration dates, denominations, limits, etc. at the time of activation.

A reconfigurable transaction card employing the passive magnetic tape may be selectively re-encoded by the smart wallet to match the encodings copied from a traditional single-use transaction card belonging to the card-holder. In this manner, the smart wallet may be employed to copy magstripe contents from, for example: the card-holder's VISA, MASTERCARD, AMERICAN EXPRESS, DISCOVERY, library card, BEST BUY gift certificate, gym pass, and the like onto a memory stored therein. When a card-holder wishes to use a certain card for a transaction or to gain access, they may select that transaction card (stored in the smart wallet's memory) and encode the contents of the selected transaction card onto the magnetic strip of the reconfigurable transaction card. Such reconfigurable transaction card may then be swiped through a reader and be indistinguishable from the single-use transaction card.

In an alternate embodiment, the storage 210 (in the above example a passive magstripe) may instead be an active microarray of wires emitting a magnetic field or fields to emulate a passive magnetic tape as described above and further detailed in the ISO standards. The ISO standard for magnetic strips divides a standard magnetic strip into three parallel longitudinal lanes including Tracks 1, 2, and 3. Track 1 stores approximately 210 bits per inch while track 2 stores 75 bits per inch, while Track 3 is not generally used. Track 1 is the primarily-used track and contains alphanumeric characters encoding an account number, a card-holder name, an expiration date, a pin code, and a card security code amongst other items. In the event that track 1 is unreadable, track 2 serves as a failover-track merely containing an account number or account identifier. Such tracks may, in an optional embodiment, be emulated by an active array/s, coils, or bands of selectively energized wires. Such wires may be laid down through any known lithographic, etching, silk screen, or other circuit board type fabrication methods.

Selectively passing a small electric current through a microwire induces a magnetic field to radiate therefrom. A plurality of wires arranged 210 per inch for track 1 emulation or 75 per inch for track 2 emulation may be selectively energized to create a plurality of magnetic fields and thereby emulate a passive magnetic strip encoded on a traditional single-use transaction card. Such active magnetic transducers or electromagnetic arrays may allow the reconfigurable transaction card to reconfigure itself dynamically between a plurality of different accounts stored therein. For example, storage memory contained within the reconfigurable card, such as a non-volatile flash memory, may contain a plurality of different single-use transaction cards. The user, actuating a selectable input button, may choose amongst the plurality of account identifiers and effectively encode the active electromagnetic array with that account identifier information for a given transaction.

In an alternate embodiment, the track 1 may be intentionally scrambled or rendered unreadable—even by simply encoding an incorrect checksum value in the check digit field or by entirely omitting track 1. Doing so may cause a Luhn algorithm failure which may indicate to the card reader that the magnetic strip is erroneous/faulty—either through mechanical failure or error in encoding. Such error may force the card reader to fall-back from the advanced feature-set of Track 1 (such as alphanumeric name encoding) to the redundant, reduced feature-set, but more-reliable Track 2. By forcing a Track 2 read, manufacturing savings, energy savings, and resiliency may be furthered as Track 2 only has 75 bit per inch density as opposed to 210 bits per inch of Track 1. Manufacturing the active inducer having a 75 microwire per inch complexity may be much less complicated, more inexpensive, allow for more resilient wires, more inter-wire spacing, allow for less-complex interference issues to be modeled and resolved and therefore be much more desirable. Additionally, Track 2 does not encode alphanumeric characters or personal data, but instead merely the bare minimum for an account identifier or unique ID. Therefore, the user's personal data is not ever transmitted to the merchant (or needed on the card). Additionally, energy savings may be realized as well.

Additionally, a service code field may be selectively encoded to a predefined value, such as 0, 1, or 6 to thereby advise the teller to require a pin code, signature, identification, or other such two or three factor verification to allow a transaction. The service code field may be selectively restricted to increase security—such as disallowing cash transactions—and allowing goods and services only or to disallow international transactions. The user is thereby empowered to selectively set security permissions on the reconfigurable transaction card to reduce liability and exposure- or contrarily, to reduce security but facilitate faster, more convenient transactions.

Alternatively, a single coil active inducer sized to mate with the read head of a standard card reader may be placed at the interface 210. The usage pattern would change—rather than swiping the reconfigurable card through the reader, the card would merely be positioned within the reader such that the actively inducing coil is brought into close proximity to the reading head of the credit card reader device. The active inducer may be programmed to have a time varying signal to emulate the sliding of the card therethrough. For example, the entirety of the encoded data may be transmitted to pass through in the time that a traditional swipe would take. Traditional cards calibrate the swipe speed by reading a series of sentinel values at the beginning of the strip. Therefore, by suitably transmitting the sentinel values, the reconfigurable card may set its own speed for transmission of the account identifier in toto. Such coil may be selectively wound to have as many turns or loops as may generally be accommodated within the smallest dimensioned traditional card-reader gap and fine-tuned to give off an approximately equal magnetic field as a passive single-use transaction card. As the magnetic field encoded on a passive magnetic strip stored in a traditional single-use transaction card is relatively weak, the power required for an active magnetic transducer may similarly be very weak. Therefore, the number of turns needed in an inducer is relatively few. Therefore, thin wires may be used and a small battery or capacitor may be used. Moreover, the coil may be positioned almost immediately abutting the reader and therefore the distance for the electromagnetic waves to propagate is not far. Following the inverse square law of electromagnetic power dissipation, the power requirement is also relatively small and thereby a small battery may be employed. While the portion of the reconfigurable transaction card that interacts with the card reader should be suitably dimensioned to fit within a gap of a card reader, the remainder of the body portion may exceed this thickness.

Alternatively, the coil may be dimensioned to be elliptical or race-track shaped so as to stretch substantially the entire longitudinal length of the card and substantially the entirety of the track 1 width. Thereby the card's universal usability is furthered as it may then be used with any traditional card reader. Any geometry that suitably accounts for field strength at the reader, dimensioned so as to fit within a card-reader, requiring little power may be employed.

Such a coil may be embedded into a recess or through-hole in the card, may be constructed through three-dimensional additive processes, or a via passing through the card may be created with a spiraling helix type pattern which may thereby act as a coil. Additionally, such coil may be embedded through lithography, screen printing, or any means known to one of skill in the art. Indeed, the number of turns in the coil may be selectively adjusted to match the desired field strength to be able to operatively couple with the electromagnetic field reader in the conventional credit card reader and thereby maintain compatibility amongst the installed point of sale (POS) infrastructure. Additionally, a ferrous metallic core may be interposed in the coil with suitable insulation to further strengthen the emitted magnetic field.

As some transaction card readers employ a magnetic noise fingerprint mechanism to statistically verify the stochastically changing nature of the noise, a noise component may be randomly induced and interposed or heterodyned with the account identifier encoded portion. In this manner, such a noise verifying measure may be accommodated.

In yet another embodiment, Track 1 or Track 2 (or both) of a rewritable magnetic strip may be further subdivided into a plurality of parallel longitudinal subtracks. Each subtrack may be encoded with different account identifiers thereon. A suitable mechanical displacement, masking, or amplifying measure may be employed to selectively present one of the plurality of encoded account identifiers to have a stronger and more dominant field to thereby be more likely to be read by the reader device relative to the other subtracks. A magnetic field masking or shunting strip or strips may be selectively employed to mask all but the desired account identifier track through a suitable mechanical manipulation reference. Further still, a magnetic track may be endowed with a plurality of layers in a depth direction to be selectively read therefrom as would be apparent to one of skill in the art.

In another embodiment employing a passive rewritable magnetic strip or tape, a flexible reconfigurable card may be provided with scored areas to enable folding to selectively present one of a plurality of passive magnetic strips to a card reader device—thereby allowing a plurality of account identifiers to be encoded on one reconfigurable card. In another example, a suitable mechanical carousel may selectively present a selected magnetic strip to the reader head. In yet another example, the card itself may be selectively positioned relative to the reader, having a magnetic strip at each of four terminal edges of both sides to thereby encode up to eight account identifiers thereon.

Figure 3:
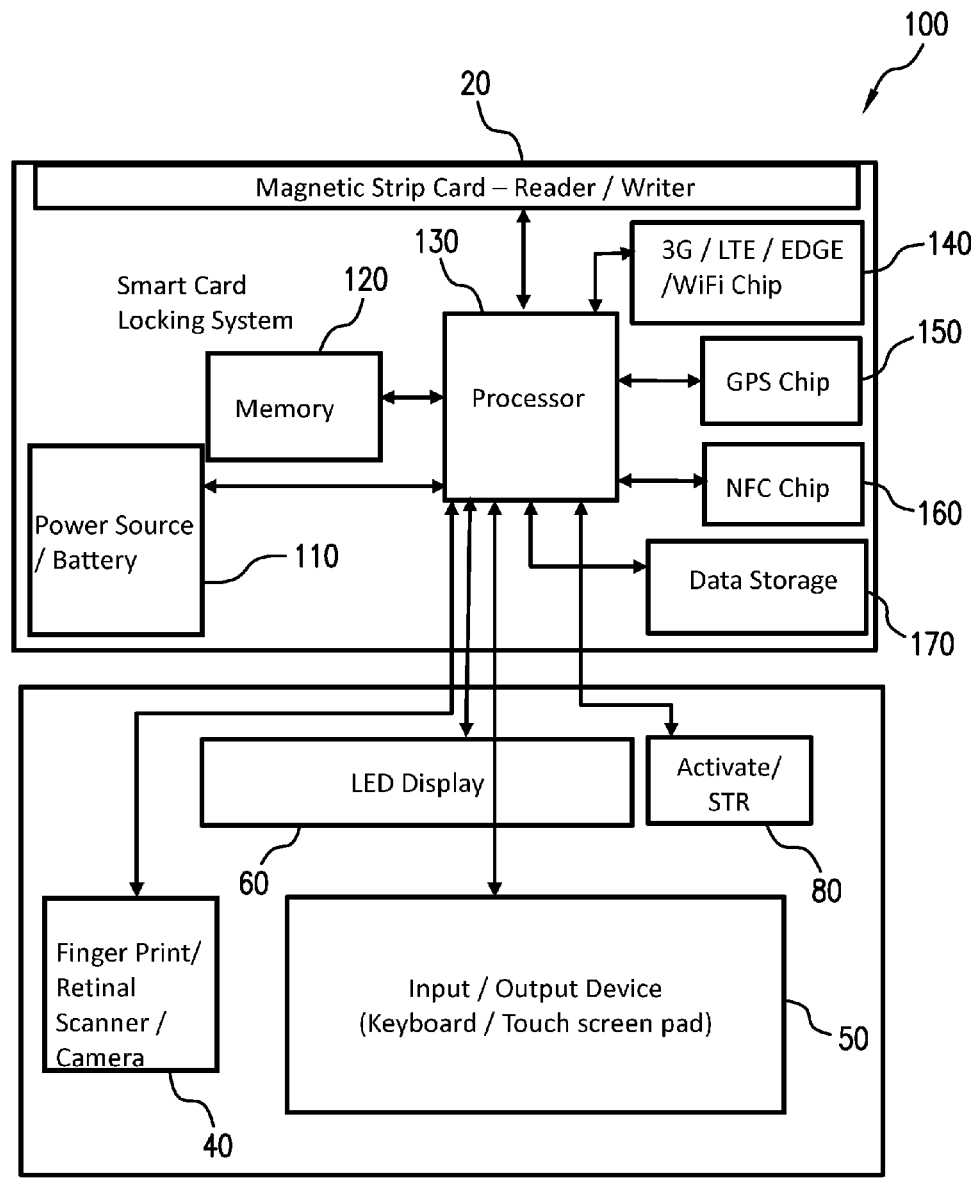
FIG. 3 is a block diagram illustrating an exemplary intercoupling of operational components in the system embodiment of FIG. 1.

As seen in FIG. 3, an exemplary interconnection of components in a highly simplified block diagram is illustrated. The smart wallet 100 preferably includes a processor 130. Such processor is preferably a low-power processor, such as, for example: a RISC, ARM, MIPS, or a low power x86, such as, for example: an INTEL ATOM, IVY BRIDGE, or other similar low power microprocessor. To further shrink package size, a System on Chip (SOC) may be used to more fully integrate components, reduce space and power requirements. With such a general purpose processor, a full feature-set operating system, such as WINDOWS CE, ANDROID, MAEMO, LINUX, and the like may be run to provide interactive services such as a smart wallet social network client, facial recognition, voice recognition, text to speech to comply with Americans with Disabilities Act, and the like. Indeed, leveraging such an existing operating system provides a plurality of benefits and allows for a completely customizable, programmable, intuitive user interface able to take advantage of existing encryption, user interface, security features, and the like. The microprocessor 130 may be directly coupled to a plurality of system components or may be coupled to a bus providing a universal connection to other components within the system. The components of the smart wallet 100 are shown directly intercoupled with processor 130 merely for illustrative, convenience, and clarity purposes. However, the components may be interconnected to the processor through any suitable interconnecting mechanism such as a bus or the like.

Processor 130 is coupled to a network interface unit 140 providing for a wireless or wired connection, such as 3G, 1×RTT, LTE 4G, WiMAX 4G, EDGE, WIFI, Bluetooth, Zigbee, Infrared, Visible light modulation, and the like to a desired network, host computer, or gateway. Additionally, the processor 130 may be coupled with, in an alternate embodiment, a GPS chip 150 for locating the smart wallet 100. Such location may prove useful in recovering a lost or stolen smart wallet, in reducing fraud and theft, and other such endeavors. An owner of a lost smart wallet may simply log in to a smart wallet or Omni Wallet community through a website or telephone service to remotely lock, wipe, or determine a location of the wallet.

A near field communication (NFC) chip 160 is coupled in this embodiment to the processor 130 for providing a wireless payment capability whereby the smart wallet may merely be waved over an NFC reader to actuate payment. NFC generally operates in a manner similar to a radio frequency identification (RFID) scheme whereby the reader device may impinge an electromagnetic field onto a smart wallet and the NFC chip may respond by modulating the electromagnetic field to be read by the reader. Alternatively, the NFC chip may operate in peer-to-peer mode and may initiate the transaction by impinging its own field onto the reader.

A data storage unit 170 may include a non-volatile flash memory or other such memory which may retain a plurality of account identifiers, personal details, such as name, credit card account number, expiration dates, security codes, and the like. A memory 120 is coupled to processor 130. Memory 120 may provide a small amount of fast working memory such as RAM. Such memory 120 supports the processor in executing programs for acquiring account identifiers, and exporting account identifiers, amongst other features. Such personal information and account identifiers may be stored and transferred internally in encrypted form or salted and hashed to obscure the true values until such time as they are needed to actually complete a transaction. Any encryption scheme that balances power and computational expense with security as would be known to one of skill in the art may be employed such as 3DES (128 bit), AES (128/256 bit), RSA, and the like. Such encryption measures should employ key rotation and expiry. Any secure hashing algorithm, such as SHA, MD5, and the like may be used.

A power source or battery 110 is provided and intercoupled with the various components of the system. Such power source or battery may be chosen among any source known to one of skill in the art to provide a reasonably suitable charge to allow the smart wallet to operate for a substantial period of time without needing to be recharged—such as, a day or a week, and likely at least 20 transactions. Such power source or battery may, for example, be provided in a lithium polymer or lithium ion battery, and in the illustrative size of, for example, 1500 milliamp hours (mah).

Additionally, the processor 130 is coupled to a display 60. Such display 60 may comprise one or a plurality of displays situated about the card. In an exemplary embodiment, a plurality of displays are provided to emulate the traditional single-use transaction card's standard locations for certain information. A traditional one-use transaction card may, for example, have information such as a name of the user appearing in the front middle of the card, whereas a name of the bank may appear in the front upper left hand corner of the card. Additionally, a signature field may appear on the rear of the card with a separate security code appearing below and to the right of the signature line. While it may not be necessary to provide a plurality of different displays to mimic the physical locations on the card of such information, it may be desirous, at least at first, to ease the transition for less capable users. However, in a preferred embodiment, a sole primary display is provided to reduce drain on the power source or battery 110 and reduce complexity and manufacturing costs. The primary display 60 may, preferably, be an electronic-ink (e-Ink) which draws no power until a refresh or a change of the screen content is desired. Thereby, a user name, account, expiration and security code may all be statically provided on the e-Ink display 60 which requires no power until a different transaction card has been selected and encoded onto the reconfigurable transaction card itself. In this manner, even if the battery is extinguished, the card number may still be displayed for transactions.

As a plurality of account identifiers and personal information may be stored in the data storage 170, an authentication or security measure 40, such as a fingerprint reader, a retinal scanner, or a camera for authentication by facial recognition may be employed. Indeed, such smart wallet and/or reconfigurable transaction card may be restricted until such an authentication measure 40 has been satisfied. Additionally, a keyboard input device 50 may be provided for a user to interact with the smart wallet and a one touch function button 80 may also be provided for quick reference and quick accessing of a predefined function, such as activation or storing of an account identifier.

In certain alternative embodiments, an existing smartphone may be used to provide certain functionalities of the smart wallet. Magnetic read and write heads may be built in and integrated into a pre-existing smartphone. Otherwise, the read and write heads may be provided by one or more external accessories coupled to communicate with the smartphone through existing interfaces such as the tip-ring-shield (TRS) 3.5 mm/2.5 mm headphone port, BLUETOOTH, WiFi, infrared, NFC, USB, USB on the go (OTG), and the like. Such an approach may allow leveraging the smartphone's processor, security, biometric sensors, internet connection, hashing, encryption/decryption functions, GPS, online web browser, display, battery and the like to thereby reduce the additional hardware components needed to physically implement the smart wallet and reconfigurable transaction card.

In an exemplary, embodiment that leverages existing smartphone infrastructure, a standalone magnetic strip reader or reader/writer device may be selectively coupled with a smartphone when needed to read or write a magnetic strip of a transaction card. Such reader device may, for example, utilize a headphone port of the smartphone (thereby enabling connectivity with all smartphones). In this alternative embodiment, an external dedicated battery and a large portion of the logic hardware may be omitted as the reader/writer device may draw power from the headset port/jack when operationally coupled using a suitably written application ("app") executing on the smartphone. An exemplary app may be provided on an IOS, ANDROID, or similar platform and provide, for example, a substantially white-noise output (or other suitable energizing signal) to the headphone jack at maximum volume to provide power to the reader/writer device. The reader/writer device may harness this energy to read and/or write magnetic strips.

Additionally, the energizing signal may be suitably modulated to encode card data to be written to a reconfigurable transaction card. Conversely, the microphone input may be employed to send card data which has been read from a traditional transaction card to the smartphone. In a preferred embodiment, the standalone card reader/writer employs digital to analog conversion (DAC), analog to digital conversion (ADC), encryption/decryption hardware, and/or a memory card reader/writer to suitably encrypt transaction card contents before leaving the reader/writer device. A suitably written application executing on the smartphone may operate to receive an acoustic or analog signal from the microphone contacts of the headphone port, convert the analog signal into digital, and store the digital encrypted transaction card contents. The storage may occur for instance in a secure portion of the smartphone memory, in a cloud server, or on a removable memory card (either disposed in the smart phone or directly on the reader/writer device itself). Such transaction card contents may then be decrypted and written to a smart reconfigurable transaction card. Where the card contents are directly written to a passive magnetic strip type reconfigurable transaction card, it is preferable that a low coercivity magnetic strip be used to reduce needed power and writing head size for writing.

Alternatively, a reader device (exclusive of a writer device) may be provided which may be coupled to the phone to cooperate with an application (or may be wholly autonomous and self-contained) to scan and record magnetic strip contents. The application that is executed (or the reader device) may then store the card contents in a secure memory location—preferably in encrypted form.

Figure 19:
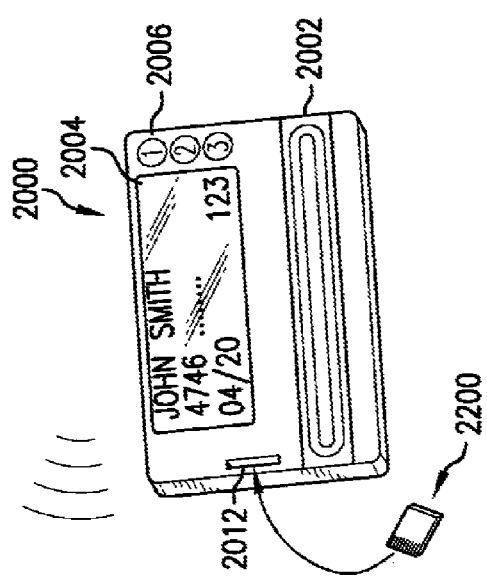

As seen in FIG. 19, a reconfigurable transaction card 2000 employing an active electro-magnet coil 2002 (as discussed above) and a near field communication (NFC) transceiver with an e-ink display 2004 and a micro SDHC memory card 2200 reader 2012 is employed. The app (residing on the smart wallet or on the smartphone) may be executed to selectively handshake with the reconfigurable transaction card and transmit stored card contents (such as account id) via NFC to the reconfigurable transaction card 2000. The reconfigurable transaction card 2000 may store the card contents into a memory thereof. Alternatively, a removable micro secure digital high capacity (SDHC), secure digital extended capacity (SDXC) card, or other suitably-dimensioned memory card may be employed to ferry transaction card contents from the smartphone or smartwallet (or directly from the reader/writer) to the reconfigurable transaction card 2000.

A strip reader device with a memory card slot may operate to scan traditional transaction cards, receiving power parasitically via headset port from a specifically written app (or potentially any pre-existing app capable of generating suitable voltage through the headset port) or via an internal battery, and write transaction card contents to the SDHC or other memory card. A reconfigurable transaction card with active electromagnetic coil may receive the memory card with transaction card accounts and potentially other secondary information stored thereon.

A minimal user interface 2006 on the reconfigurable transaction card 2000 may allow a user to select one of a plurality of traditional transaction card contents stored on the SDHC card 2200 and execute a processor to effect modulation of those transaction card contents (such as account number) through the active electromagnetic coil 2002 to be read by a card reader at a point of sale (POS) device to effect a purchase or transaction.

When actuated to effect payment, the reconfigurable transaction card preferably displays at least a portion of the captured transaction card contents and/or secondary account information on an e-ink display and selectively energizes the active electromagnetic coil to communicate the card contents to a reader device at the point of sale (POS) terminal of a vendor.

To save energy, the reconfigurable card may postpone magnetic coil activation until it is brought into contact with the magnetic read head of the card reader device at the POS. Such determination of proximity may be triggered through the physical closing of an open circuit such as by mechanical displacement by the walls abutting the recess of the POS card reader, via a detected capacitance change, via contact with the metal head of the read head to close a sensing circuit, by actuating a manual button, or the like.

Figure 4:
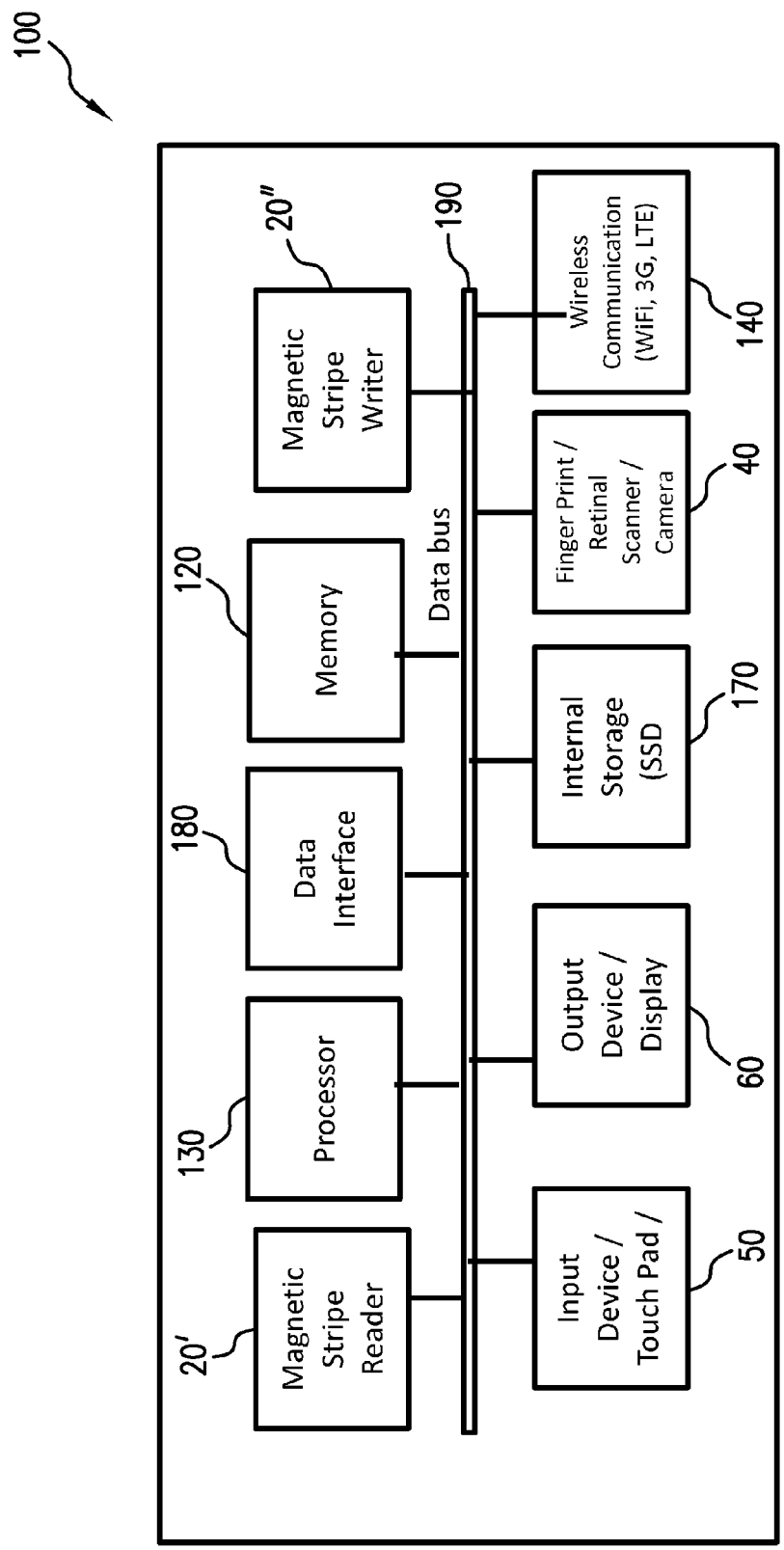
FIG. 4 is a block diagram of an exemplary intercoupling of operational components in accordance with one exemplary embodiment of the present invention.

As seen in FIG. 4, a plurality of hardware components shown in block form are intercoupled through a data bus 190 an exemplary embodiment of the smart wallet 100. A magnetic strip reader 20' is provided for reading magnetic strips from a one-use or single-account transaction card. A magnetic strip writer 20" is also provided for outputting directly to a reconfigurable transaction card or to a card reading device such as a point of sale terminal. Additionally, a processor 130 is coupled to data bus 190 to enable interaction with memory 120 and a data interface 180. An input device/touch pad 50 is also intercoupled to the data bus 190 as are an output device/display 60, an internal storage, such as a solid state drive (SSD) 170, and an authentication mechanism 40, such as a fingerprint reader, retinal scanner, and/or camera. A wireless communication module such as a WIFI, 3G, LTE, and any other interconnecting networking measures 140 are provided.

Figure 5:
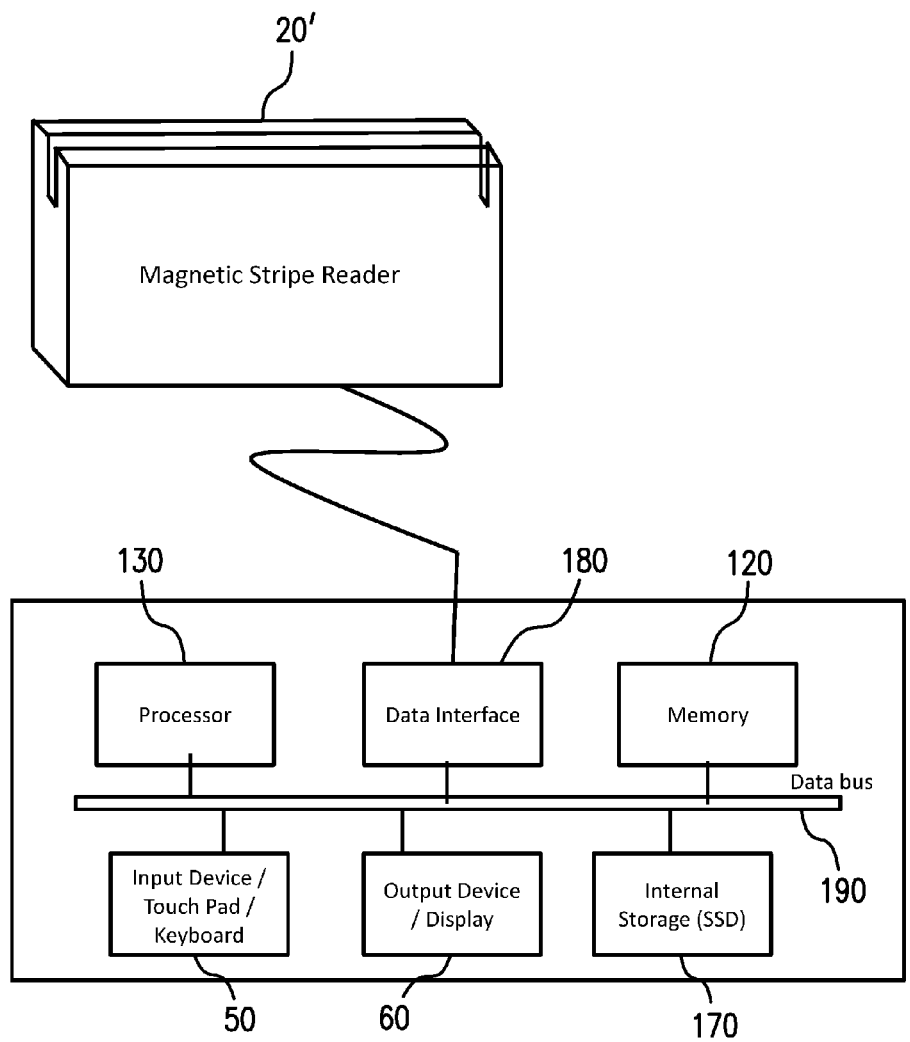
FIG. 5 is a block diagram illustrating an exemplary intercoupling of operational components in accordance with one exemplary embodiment of the present invention.

As seen in FIG. 5, a smart wallet including a magnetic strip reader 20' is coupled to a data interface 180 which is coupled to various components through a data bus 190. A processor 130 is also coupled through data bus 190 to a memory 120 and an input device or touch pad 50 is also coupled thereto. An output device/display 60 is coupled to the data bus and an internal storage (SSD) 170 is also coupled to the data bus 190. In this manner, a magnetically encoded transaction card can be swiped through the magnetic strip reader 20', transmitted to the data interface 180, and be stored temporarily in memory 120 for processor 130 to act thereupon and potentially transcode, parse, or encrypt the magnetic strip and store as an account in the internal storage 170. The account identifier or other account information may be displayed on account display/device 60 and a user may actuate the input device, touchpad or keyboard 50 to accept the storage of the account identifier into the internal storage 170.

Figure 6:
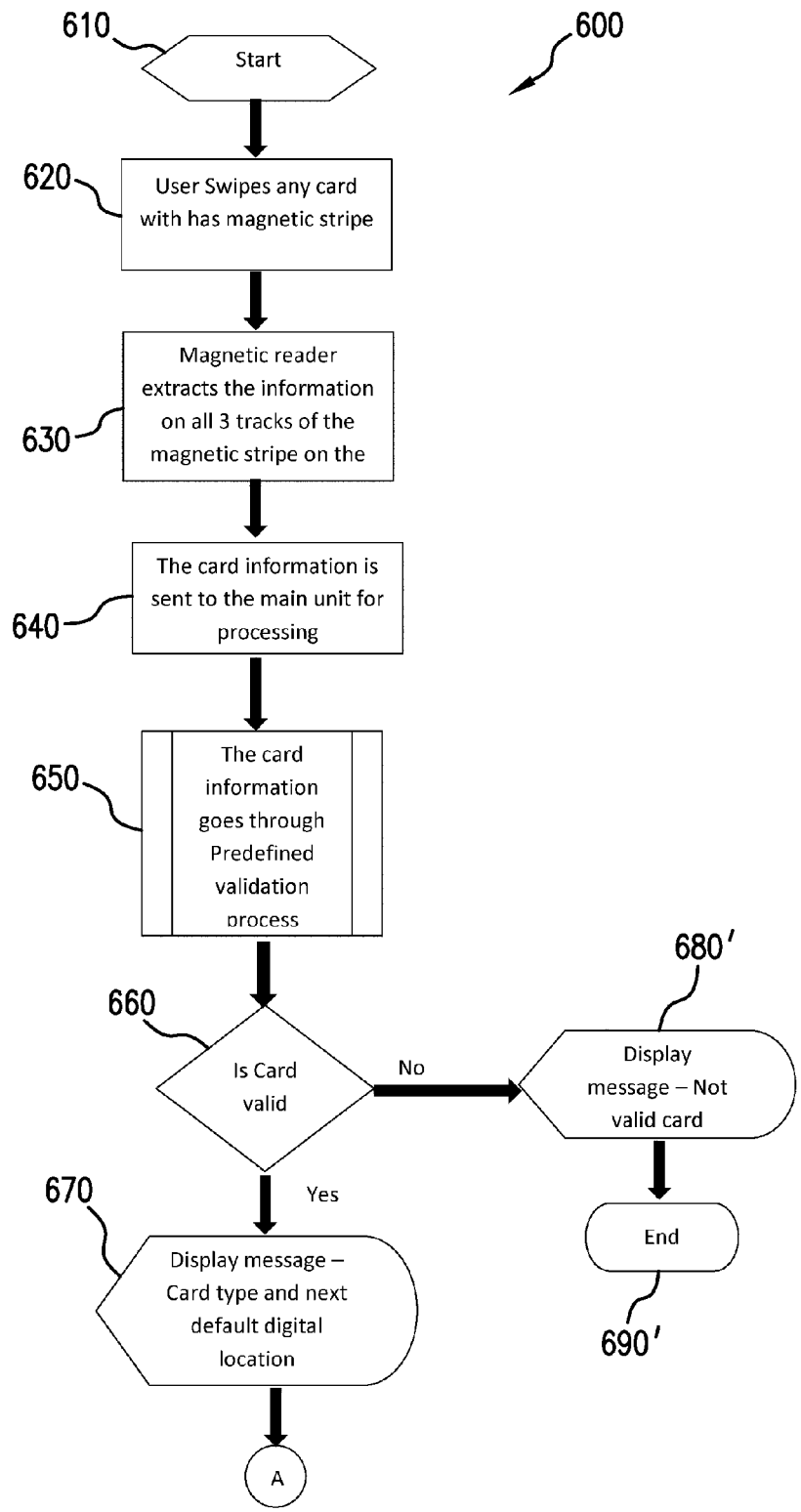
FIG. 6 is a flow diagram illustrating an exemplary process for storing a transaction card into a smart wallet in accordance with certain embodiments of the present invention.

As seen in FIG. 6, a simplified flow diagram illustrating an exemplary method 600 for storing account identifiers and account information from a transaction card is illustrated. The flow begins at block 610 and proceeds to block 620 where a user swipes any card with a magnetic stripe. Such magnetic card may be any transaction card as discussed above and illustratively including a gift card, a credit card, a debit card, a stored value card, hotel entry card, and the like. At block 630, the magnetic reader extracts the information on at least one track of the magnetic strip of the card. In a preferred embodiment, the magnetic reader may extract the information from all three tracks of the magnetic stripe on the card. ISO standards define that track 1 is a 210-bit per inch encoding of alphanumeric characters including a sentinel value, an account value, or account identifier (used interchangeable herein), expiration date, a secret code, and also a user name. Track 2, according to ISO standards, is a 75 bit per inch redundant data track that is to be read if track 1 is unreadable. Track 2 does not contain alphanumeric characters, but instead contains only digits 0-9 and several sentinel or signal characters such as, for example, an exclamation or percentage mark. In the event that track 1 is unreadable, the kernel or nucleus of important information, such as the account number and expiration date, is decoded therefrom. In the event that track 1 is unreadable, a reader will attempt to read track 2 and thereby discern the account identifier which can be passed along to a billing provider such as VISA, MASTERCARD, AMERICAN EXPRESS, and the like. The third party billing provider may then correlate the account number with the user and other such information. Track 3 is a further redundant track which is generally not used. However, in a preferred embodiment, to more comprehensively emulate the single-use transaction card, the information contained in all three tracks is promiscuously read and stored.

The internal storage space within the card may be big enough, such as 8 gigabytes that these few kilobytes of information are generally negligible in terms of storage space occupied. With even a gigabyte of storage, an almost unlimited number of account identifiers may be stored. Such information should be encrypted or otherwise secured before being stored. At block 640, the card information including at least an account identifier is sent to the main unit processor 130 for processing.

At block 650, card information is verified as necessary through a predefined validation process. Such predefined validation process may be via simple checksums or preprogrammed rules which, while not infallible, may provide for a certain acceptable level of validation. For example, in a credit card number, the first digit, the Major Industry Identifier (MII), generally a 4 may represent a VISA and a 5 may represent a MASTERCARD. In this example, if it is determined that the card number does not match the MII, or the user has entered a VISA and a first digit does not accord thereto, the validation process may fail. Alternatively, a check sum, digest, or hash of the credit card, such as by employing a Luhn Algorithm or Mod 10 algorithm may provide a quick and dirty, processor inexpensive, and external communications inexpensive means for determining the validity of the card. Additionally, an inter-track validation mechanism may be employed whereby the account number recovered from Track 1 may be compared against an account number on Track 2 or 3—and only if account numbers are in agreement will the card be considered valid.

Preferably, the card's validity may be verified without referring to an external source such as network communication to a host, to thereby save battery and thereby ensure privacy. Still further, a longitudinal redundancy check (LRC), a cyclic redundancy check (CRC), or check sum may be employed inasmuch as a predefined field/digit within the credit card or debit card may be based on an expiration date thereof. Should the predefined field not match the entered expiration date, then a validity check may fail.

At block 660, a determination is made whether the card read is valid. If the card is determined to not be valid, then a display message that the card is not valid may be provided to the user at block 680' and then an ending sequence may be commenced at block 690'. Alternatively, a cyclic redundancy check (CRC) or error correcting codec (ECC) may be employed to correct the card read as may be known to one of skill in the art. However, the most expedient manner for resolving the validity may be merely to rescan the card again.

Figure 6A:
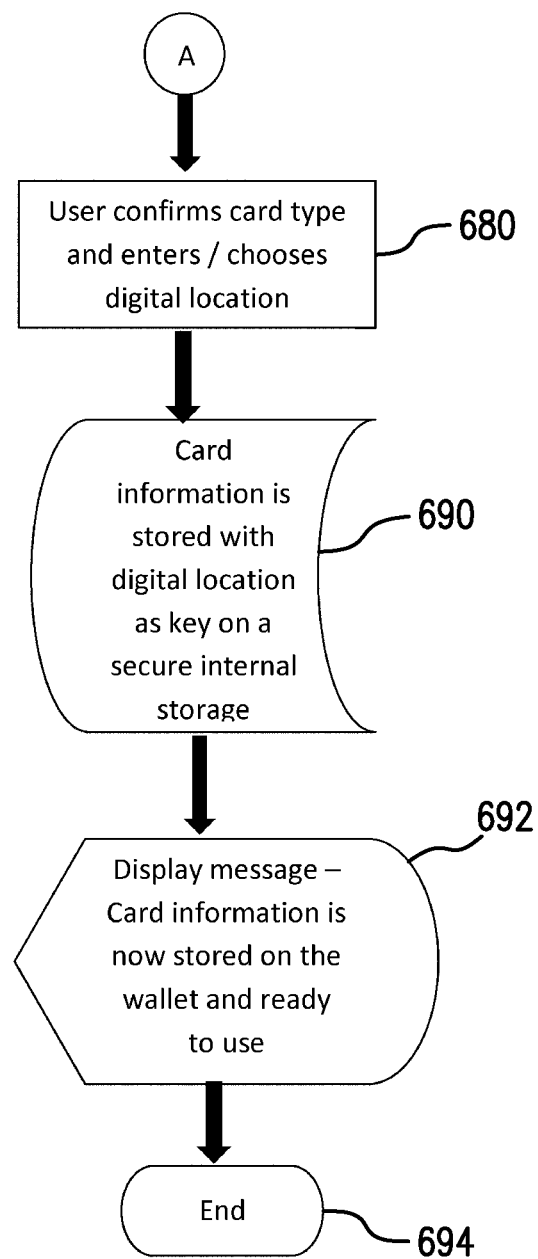
FIG. 6A is a continuation of the flow chart of FIG. 6.

If, on the other hand, the card validity check is affirmative, then the block proceeds to block 670 where a message may be displayed indicating the card type and the default digital location within the internal storage space 170 for storage of the card information. Flow proceeds to block 680 of FIG. 6A where the user confirms the card type such as MASTER-CARD or VISA and enters or chooses a digital location within the internal storage 170 for storage of the account details or account identifier. At block 690, the card information is stored with the digital location as a key on a secure internal storage and referenced for retrieval through the location in the memory.

At block 692, a message may be displayed to a user that the card information is now stored on the smart wallet and ready to be used. The flow for recording and storing the account identifier information from the card information is then completed at block 694.

While the aforementioned Figures discuss storing a magnetic transaction card, any encoded card may be stored herein. For example, a smart card having a processor chip thereon may be read and emulated through an appropriate configuration of pins to interface with the surface mounted pads of a smart card. Thereby, the data values stored within the smart card or a mapping of inputs to corresponding outputs may be read and stored within the memory in similar fashion as the magnetically stored account information.

In certain embodiments, an optical scanner such as a digital camera, charge-coupled device (CCD), barcode scanner, or the like is provided on the smart wallet to scan a bar-code stored-value device, receipt, admission ticket, recycling credits, coupon, and the like. In certain embodiments, the retinal scanner/camera 70 or 70' (discussed in connection with other embodiments) may be employed for this purpose. Indeed, anything with a barcode may be scanned and stored in similar fashion. Receipts may be stored through the use of the barcode scanner and correlated with purchases that may be securely logged within the smart wallet or reconfigurable transaction card. Moreover, a near field communication (NFC) or radio frequency identification (RFID) mechanism may be used for reading values from an NFC or RFID card and storing such values into internal memory for later use. The smart wallet (or 'Omni Wallet') may intelligently classify scanned items. For example, scanning an event ticket will result in the event ticket being stored in an "event ticket section" of the user interface thereby enabling ready retrieval and avoiding lost ticket issues. All information from the scanned item will be stored in a secure memory location such that it may be used in substantially identical fashion as the original version of the given coupon, event ticket, or the like. Paper copies may additionally be stored as backup.

When an item is ready for purchasing, the Omni wallet may search through a database of coupons. The database of coupons may be maintained in an Omni Community, for example, which synchronizes with newspapers, online coupon websites, specific store websites, flyers, periodicals, user scanned coupons (discussed above) and the like to find relevant coupons for particular items to be purchased. Upon locating an appropriate coupon, it may be communicated to a teller or Point of Sale (POS) machine. Such communication may be by any suitable means known, such as the coupon (and barcode) being displayed on a display of the smart wallet, emailed to the store, faxed, or automated redemption measures for coupons (such as an electronic code or a website portal). A post-purchase process may be employed as well. Such a process may search receipts, transaction logs, web purchase logs, and the like stored in the smart wallet or online Omni Community to identify items purchased and automatically locate coupons for those purchased items. Such located coupons may then be automatically paired with receipts and communicated to a manufacturer to initiate rebates and the like. If an identifier like a UPC code is required, it may be selectively retrieved from the smart wallet memory, or the user may be prompted to either take a picture of the UPC code or to physically mail it separately.

Figure 7:
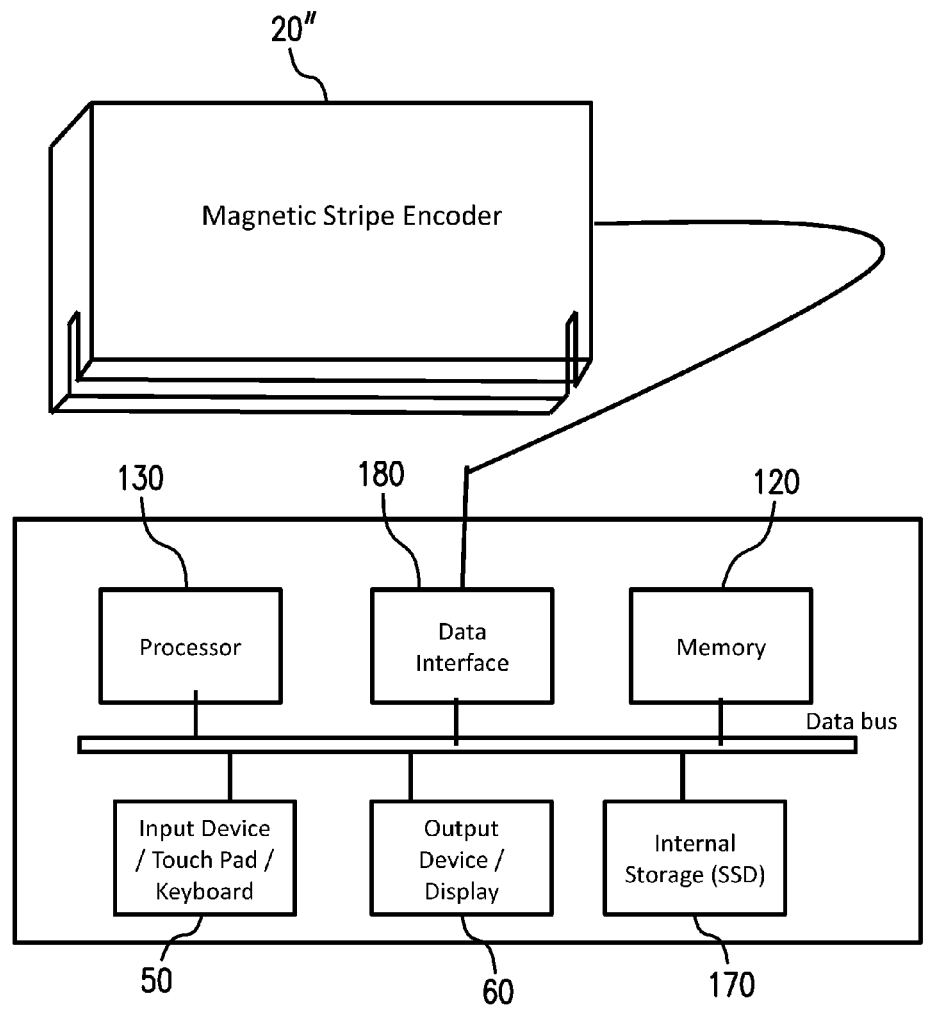
FIG. 7 is a block diagram illustrating an exemplary intercoupling of operational components of a smart wallet in accordance with certain embodiments of the present invention.

As illustrated in FIG. 7, a smart wallet having a magnetic stripe encoder 20" is employed. Magnetic stripe encoder 20" is operatively coupled with the data interface 180 which then, in turn, is intercoupled through data bus 190 to a plurality of components within the smart wallet. The processor 130, memory 120, input device 50, output device/display 60, and internal storage 170 are all intercoupled via data bus 190 to the data interface and ultimately the magnetic stripe encoder 20".

Figure 8:
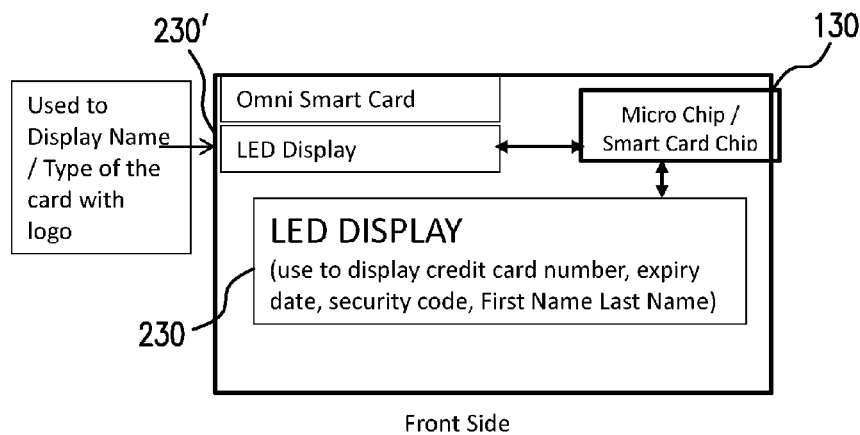
FIG. 8 is a block diagram illustrating an exemplary reconfigurable transaction card in accordance with certain embodiments of the present invention.
Figure 8A:
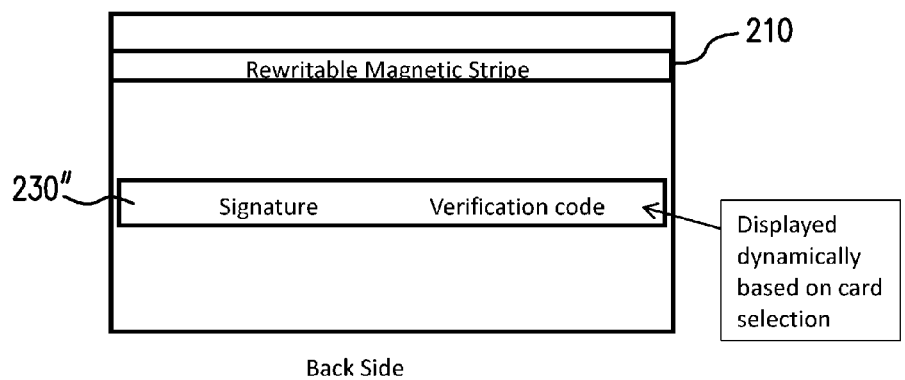
FIG. 8A is a reverse view of the block diagram of FIG. 8 illustrating an exemplary reconfigurable transaction card in accordance with certain embodiments of the present invention.

The magnetic stripe encoder 20" may thereby encode a stored account identifier from any of a plurality of single-use traditional transaction cards onto, for example, a rewritable magnetic stripe (as seen in FIG. 8A). The reconfigurable transaction card 800 as seen in FIG. 8 may include a plurality of display devices such as an LED display 230', a primary LED display 230, and potentially a signature verification display 230", as seen in FIG. 8A.

Alternatively, a single display 230 may be used and the information that may have been displayed on a plurality of displays may be combined to be displayed on the single display. Single display may ease fabrication, reduce complexity, and reduce expense of manufacture, as well as reduce internal signal and power interplay issues. Preferably, an electronic ink (e-Ink) display may be used, however, an organic light emitting diode (OLED) or any traditional low power, low profile, high resiliency display may be used.

Such display 230 may be used to display a visual representation of the credit card number or account identifier, an expiration date, security code, first name, last name, a verification code, a signature, a type of card, a card-issuer logo, a picture of the card-holder, and the like. The smart wallet may transfer such information through a microchip or smart-card chip 130 which may have a plurality of surface mounted pads, terminals, pins, or interface junctions for transmitting data from the smart wallet to the reconfigurable transaction card 800. Alternatively, such information may be passed to the reconfigurable transaction card 800 through an NFC, Bluetooth, Zigbee, WIFI, or other wireless transmission means. In an embodiment where a rewritable magnetic stripe 210 is not employed, but an active transducer such as a micro-wire array or a single wire coil, the account information and supplementary information may be transmitted to the card through the magnetic encoding thereof.

Figure 9:
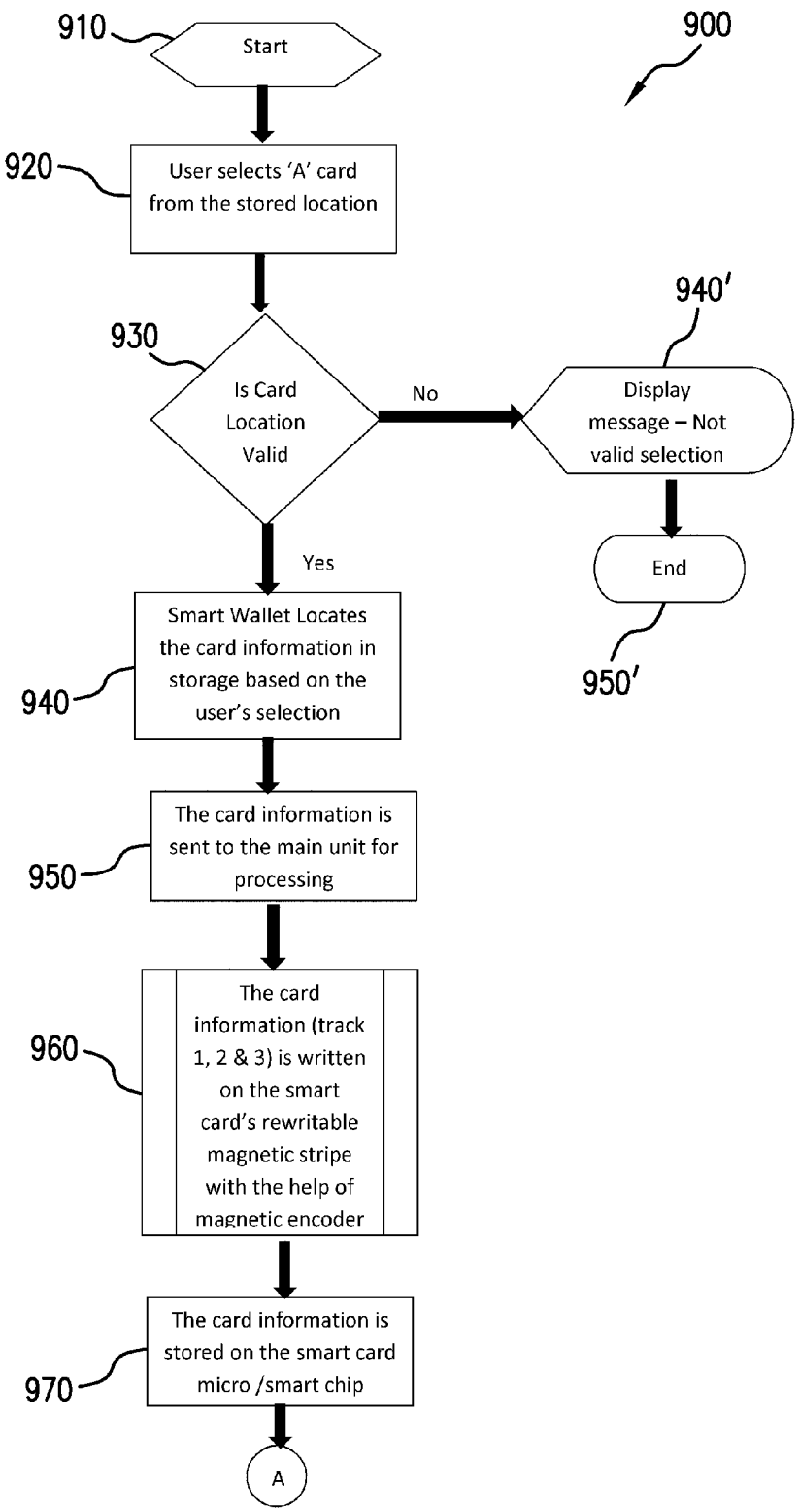
FIG. 9 is a flow diagram illustrating an illustrative process for writing a stored transaction card's account information to a reconfigurable transaction card in accordance with certain embodiments of the present invention.

Referring to FIG. 9, an exemplary flow for retrieving a stored value card 900 from the smart wallet is shown. At step 910, an exemplary flow is started. At block 920, a user selects a card from the stored location within the smart wallet. For example, a user may select their VISA, MASTERCARD, AMERICAN EXPRESS card, or any other card which has been prestored into the smart wallet. Alternatively, the smart wallet may be delivered with one or a plurality of account identifiers prestored therein by a card issuer. In another example, the account identifiers may be delivered wirelessly from the third party credit institutions.

At block 930, the selected card's memory location is checked to determine whether it is valid or not. If the card location is not valid, meaning that no card or account location is stored, or if the memory has become corrupt, then the decision fails and flow proceeds to block 940' where a "non-valid selection" message may be displayed to a user. Then, an ending block 950' terminates the process of recovery. The flow may then proceed back to the start block 910 where a user may then again be prompted to select a card location.

Alternatively, if the decision at evaluation block 930 is affirmative then flow proceeds to block 940 where the smart wallet locates the card information or account identifier information in the storage based upon the user's selection. Flow proceeds to block 950 where the card information is sent to the main processing unit 130 for processing. At block 960, the card information (preferably tracks 1, 2, and 3, though not necessarily) is written on the smart card's rewritable magnetic stripe, via the magnetic encoder/write head of the card interface unit. Alternatively, such information is transmitted to the reconfigurable transaction card and stored in the card's internal memory. In this case, the reconfigurable transaction card may then be able to dynamically retrieve such account identifier and card information from the reconfigurable transaction card's memory and dynamically (in either a time or a spatial domain), emulate the magnetic stripe and encode the account information.

At block 970, if a passive magnetic stripe is being used, the card information may then be stored on the smart card or smart chip of the card for displaying such information as the brand of card, the account number, the expiration date, the user name, and the like. Where an active magnetic transducer is employed, such information may flow seamlessly through the active transducer acting as a receiver from the smart wallet via an electromagnetic coupling of the wallet's writer with the card's transducer. Such account information may then be stored within a non-volatile memory within the reconfigurable transaction card and may be retrieved on-demand for output through the magnetic transducer to a point of sale system and/or simultaneously through a display screen on the reconfigurable transaction card itself for human readability.

Figure 9A:
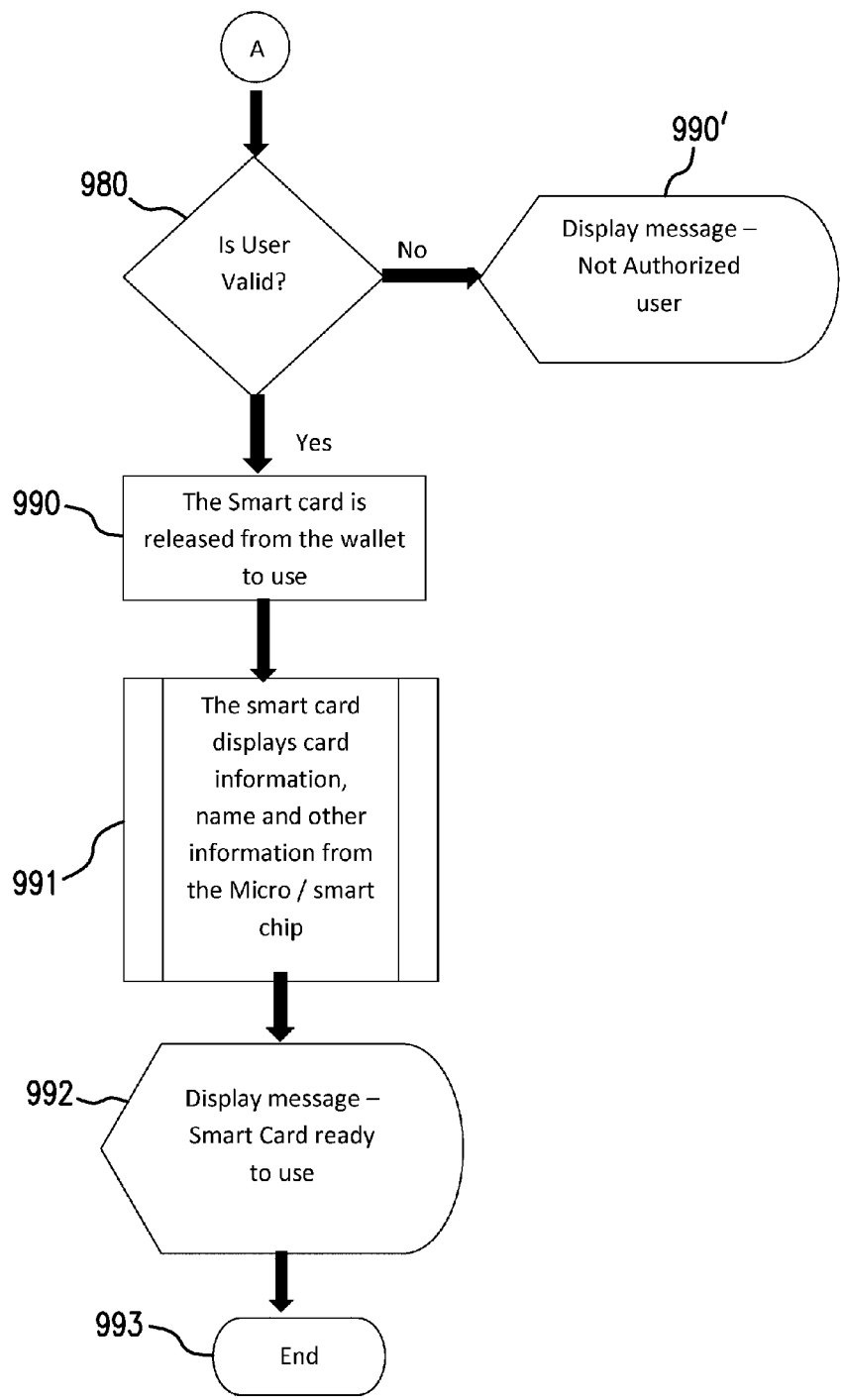
FIG. 9A is a continuation of the flow diagram as illustrated in FIG. 9 of populating a reconfigurable transaction card with account information or identifiers as recovered from a conventional transaction card.

Flow then proceeds to block 980 as seen in FIG. 9A where the user's validity is determined. Such validity of the user may be determined through biometric means, such as by interrogating a user's retina through such means as a camera or a retinal reader. Alternatively, a fingerprint reader may be employed to determine whether the fingerprint of the user matches the card-holder's fingerprint. The owner of the smart wallet may initialize their smart wallet by storing a retinal pattern, fingerprint, voice sample, and the like on first use to establish the biometrics of the authorized user/s. To protect a user's biometric information such as the retinal pattern, fingerprint, voice sample, and the like, may preferably be stored in encrypted state or salted and hashed—with the hashed value thereof being stored. Subsequently when authenticating a user, the current sample should pass through the same encryption or salt and hash to be compared to the initialized values.

Alternatively, a password, a facial recognition, voice recognition, or the like known to one of skill in the art may be employed to ensure that the person actuating the smart wallet or reconfigurable transaction card is indeed an authorized user of the account. If a user fails several times to authenticate, such as, for example, 3 times, the smart wallet may request answers to personal questions before allowing a user to proceed.

A smart wallet owner may establish varying levels of security depending on the risk involved in unauthorized use or likelihood of delegation. The user may define roles and functions for each authorization level. For example, only the designated user may be enabled to actuate a VISA or MASTERCARD account, whereas, a user's spouse or designated third party user may be selectively authorized for use of, for example, a gym card. In this manner, a selective amount of security may be employed where necessary based upon the risks engendered by allowing use or the card-holder's amount of trust in $3^{rd}$ parties. Clearly, providing carte blanche to use a VISA card with a $20,000.00 credit limit may be quite risky and accordingly, the universe of allowed users may be restricted quite strenuously. Contrastingly, a gym card use may be almost promiscuously allowed for any user.

In the event that the user is not an authorized user at block 990', a message informing the user of a rejection may be displayed to the user. Alternatively, or, additionally, a plurality of safety measures may be effected. For example, a lockdown of the device may be enacted, a remote phone-home feature may be enacted, or a temporary deactivation of the account or smart wallet may be employed should an unauthorized user attempt use thereof. In a less intrusive manner, the unauthorized user may merely be photographed or documented through a recording of their fingerprint, iris, voice sample, and/or facial picture, and such information may be merely stored and time-stamped in the event that a fraudulent use activity is later determined. In the event that such fraudulent use was determined, then the biometric information may be recovered by law enforcement, insurance, or credit card companies. The user themselves may be presented with the recorded biometric information such as through a display screen, an email, or a telephone call whereby the authorized user may then realize that, for example, a child or spouse has attempted to use the card inappropriately and the user may be empowered to determine the consequences thereof.

Still further, a GPS module may be activated upon encountering an unauthorized user so that the location and subsequent retrieval of the wallet may be facilitated. Alternatively, the contents of all internal memory may be wiped, for example: by encoding all zeros, or all ones, or random numbers to the magnetic strip, the non-volatile memory, processing registers, and other such storage locations. Thereby, a compromised smart wallet or reconfigurable transaction card may be assured to be unredeemable or unusable.

If instead, a valid user has been authenticated, then flow proceeds to block 990 where the smart card may be released from the wallet to use. In this embodiment, the smart card or reconfigurable transaction card may be lockably retained within a jacket or electronic body portion of the smart wallet. The reconfigurable transaction card may be retained within an inaccessible slot within a hard metallic body and is only ejected through a motorized, step motor, actuator, or other mechanical actuation devices within the receiving chamber, such as seen, for example: within an APPLE MACBOOK, where a CD is lockably retained within the drive until a command within the computer has been executed to release the CD. Upon release of the reconfigurable transaction card from the wallet at block 990, the smart card may display card information at block 991 such as a name and other information stored within the microchip or smart card chip. At block 992, the smart card may display a message to a user that the smart card may be ready to use and the flow terminates at block 993.

Figure 10:
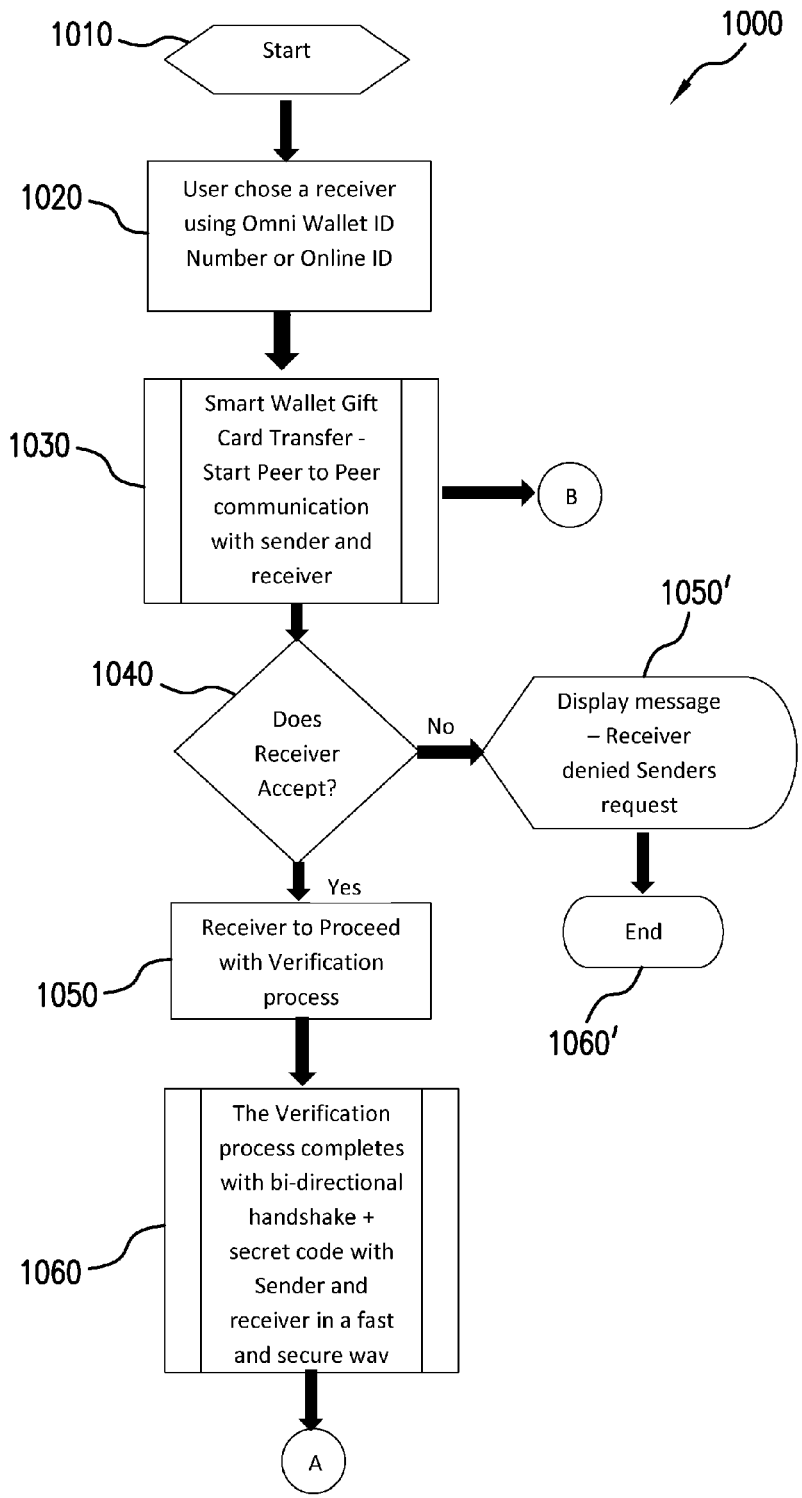
FIG. 10 is a flow diagram illustrating an exemplary process for exchanging transaction cards through a computer network.

As seen in FIG. 10, an exemplary process 1000 for exchanging gift cards using smart wallets in accordance with certain aspects of the present invention is disclosed. Block 1010 initiates the process. At block 1020, a user chooses a receiver using a Smart Wallet ID, Omni Wallet ID, online ID, or other unique identifier. During initialization of the smart wallet device, a user may be asked to register with an Omni Wallet community to activate the Omni Wallet device. Each Omni Wallet or smart wallet device preferably has a unique identifier (UID) unalterably embedded therein that may be tied with a user account and used as a key for secure communications. Such UID may include an integrated circuit card identifier (ICCID) which is an international standard used almost universally for SIM cards.

Existing social networks may be leveraged to send to, for example: a Facebook, or Linked-in friend account which may be associated with another smart wallet. Thereby, the user of the first smart wallet may select a recipient to send a gift card or stored value transaction card to. Preferably, communications between starting and ending points across a network will be secured with secure sockets layer protocol such as HTTPS/SSL though other secure transmission schemes will be apparent to those of skill in the art. Additionally, two smart wallets may employ a secret key exchange whereby a random key may be generated on the sender wallet with an expiration timer and the same key may be used on the receiver wallet to complete the verification or establish a trusted user relationship. Such relationship of trust may then be used to confidently exchange account identifiers or other such information, such as, in a gift card exchange.

At block 1030, the smart wallet gift card transfer starts a peer-to-peer or direct communication between the sender of the transaction card and the receiver of the transaction card. Alternatively, an infrastructure mode may be employed by leveraging a secure on-line community which may be established such as an Omni Wallet or Smart wallet community which may act as a social network to securely intercouple separate parties. Thereby, a first smart wallet user may develop a relationship of trust with a second smart wallet user to enable a first user to send a stored value card to a second user by means of wireless communication, communication through a social network, or any other means as would be known to one of skill in the art. Such network enables a first user with a physical single-use transaction card to scan the transaction card into a secure memory within the smart wallet, dispose of the original stored value card, and transmit the data or account identifier that was encoded on the original transaction card to another user by means of the internet or wireless network. Thereby, a market may be established for pre-existing stored value cards such as a HOME DEPOT, SEARS, MACY'S gift certificate, or a coupon.

At block 1040, a receiver may be provided with an option to accept the proposed stored value card. If the receiver declines at block 1040, then the flow will proceed to block 1050' where a message stating that the receiver denied the sender's request may be sent to the initial sender of the first smart wallet. Flow then proceeds to the end block 1060'. Alternatively, if the receiver does indeed accept the transaction at block 1040, then the flow may proceed to block 1050 where the receiver may proceed with a verification process.

At block 1060, the verification process may complete with a bi-directional handshake and a secret code with a sender and receiver in a fast and secure manner. The two or three stage handshake coupled with a secret code may be implemented with any known security or encryption measures as would be known to one of skill in the art. For example, one may use a public/private key or a shared secret type authentication system.

Figure 10A:
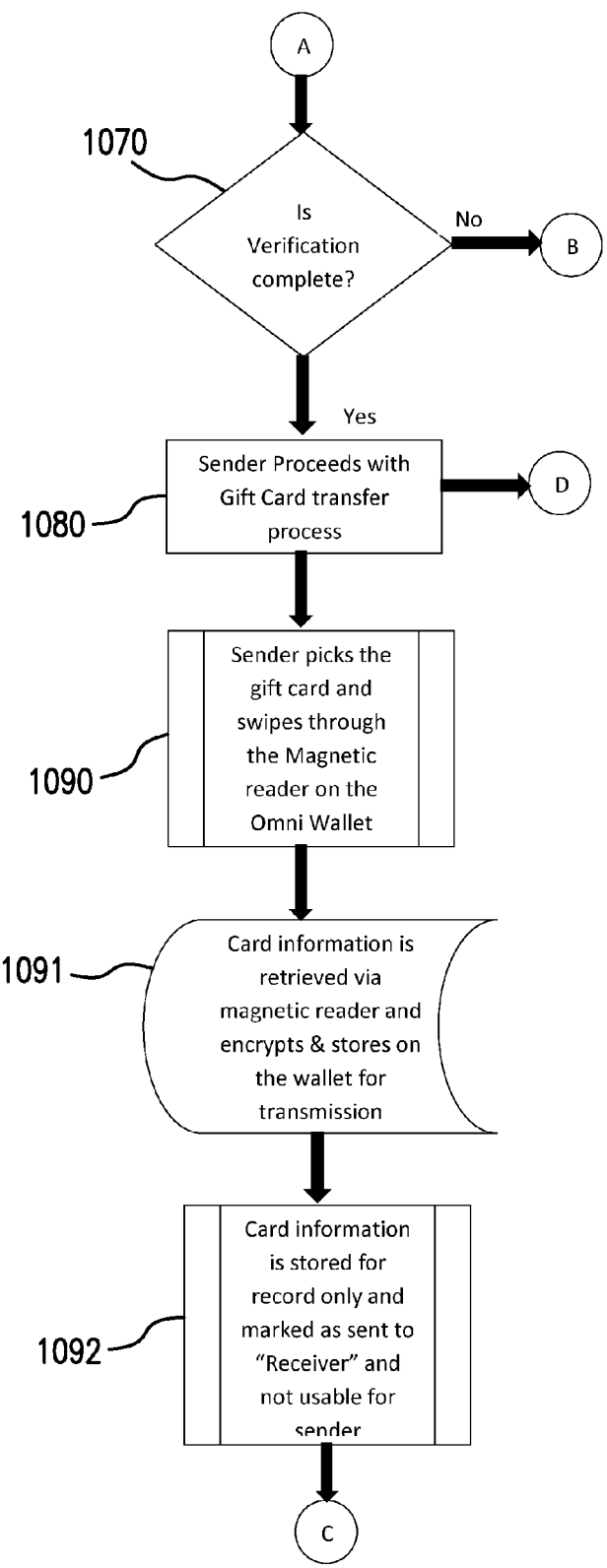
FIG. 10A is a continuation of the flow diagram of FIG. 10 illustrating an exemplary process for exchanging gift cards virtually.

As seen in FIG. 10A, flow then proceeds to block 1070 where it is determined whether a verification of both senders' identities is complete. If the verification is not complete, then flow will proceed back to reinitiate the verification procedure. If however the verification is indeed complete, then the flow proceeds to block 1080 where the sender proceeds with the gift card transfer process. At block 1090, the sender chooses the gift card and swipes through the magnetic reader on the omni wallet or smart wallet. The sender may read from a magnetic card, a barcode, a smart chip card, and the like. The magnetic reader is merely an exemplary illustration. At block 1091, the card information is retrieved via the magnetic reader and is encrypted and stored on the smart wallet for transmission.

At block 1092, the card information is stored for record only and marked as having been sent to receiver (additionally, the receiver's name and unique smart wallet UID may be stored) and not useable for the sender through the smart wallet. Additionally, the original card may be rendered unredeemable. Such rendering of the original transaction card may be through an encoding of zeros, ones, or a random pattern to the magnetic strip of the transaction card. Additionally, a means for obscuring, defacing, or destroying a magnetic strip, barcode strip, chip pins, or other such means of rendering the original card unredeemable so as to provide full faith in the receiver of the card that this a bonafide exchange, may be provided. Thereby users may trade with confidence beyond their circle of trusted friends.

At block 1093, the card information or account identifier is then securely transmitted to the receiver's smart wallet from the sender's smart wallet. At block 1094, the receiver is prompted and delivered a notification about the incoming gift card transfer from the sender. At block 1095, it is determined whether the receiver accepted the incoming transmission of the gift or stored value transaction card. If the sender did not accept, then the flow proceeds to block 1096' and a message may be displayed to the sender that the gift card was denied.

Flow may then proceed to a general error message at block 1090' of FIG. 10C that the swipe may be denied by the receiver and to please try again. Flow may then proceed to block 1091' where the transaction is cancelled. However, if the receiver did indeed accept the transfer at block 1095, then the flow may then proceed to block 1096 where the card or account information/identifier is securely downloaded and stored in a location of the receiver's smart wallet.

At block 1097, the card information or account identifier may be permanently stored in digital code for immediate usage. Thereby, the receiver may then actuate the smart wallet to write the account information or identifier to the reconfigurable transaction card contained within a jacket of the smart wallet. The reconfigurable transaction card bearing the traded account identifier may then be utilized at a merchant by being swiped through a magnetic card reader. Alternatively, an NFC, RFID, or barcode may be employed for the receiver to realize the benefit and redeem the traded stored value card.

Upon successful completion of the transfer at block 1098, a message confirming receipt is delivered to both the sender and the receiver. Flow then proceeds to block 1099 of FIG. 10B where the exemplary process for gift card or stored value card transfer is completed. Additional features may be apparent to one of skill in the art, such as payment linking to other accounts such as, for example, PayPal, Amazon, School food plans, and the like may be provided. Additional features may be added through an open API allowing third parties, such as, for example: banks, websites, vendors, and payment processors to create additional functionality or integrate the smart wallet within their purchasing network.

Once the gift card or stored value cards have been scanned into the smart wallet they may be uploaded or synchronized with an online vault, clearinghouse, or repository such that they are safely guarded in the cloud or online smart wallet community, for example, in an Omni Wallet Community or Omni Community social network. The Omni Community may provide for a host of functions and features such as gift card storage, exchange, advertising, sale, purchase, and the like. As the gift cards may be stored online, exchanges may then be effected without either smart wallet of the trading parties being physically present. Such transfers sans smart wallets may be performed through the use of online terminals, computers, telephones, or the like. Indeed, an application ("app") may be provided to facilitate such transfers and other features present in the Omni Community. An exemplary app may be provided for IOS on IPHONES, ANDROID devices, NOKIA devices, WINDOWS PHONE devices, WINDOWS CE, MACINTOSH, Wintel computers, LINUX, and the like.

Figure 10D:
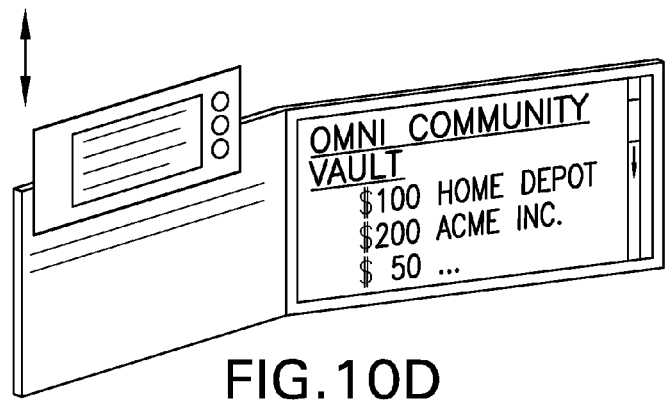
FIGS. 10D-F are schematic diagrams illustrating an example of measures employed in accordance with an exemplary embodiment of the present invention for interacting with an online Omni Wallet Community.
Figure 10E:
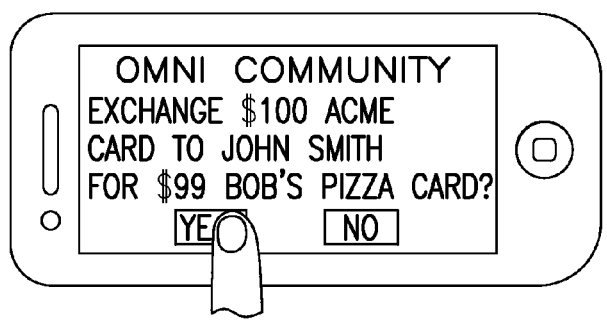
Figure 10F:
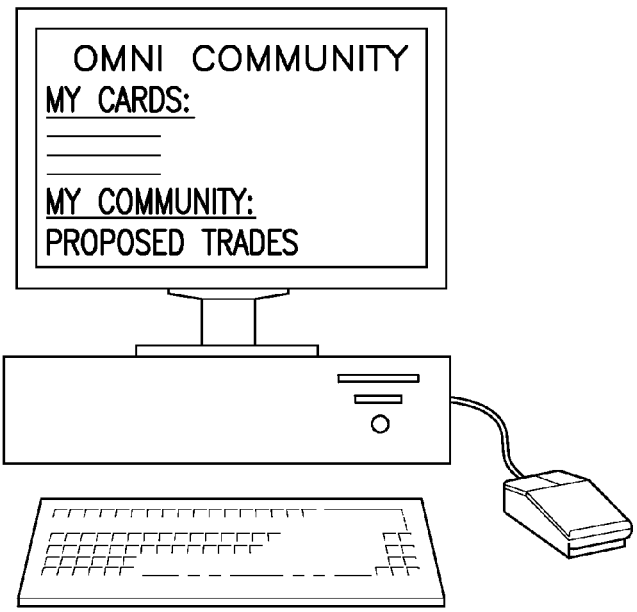

Members may log in to a secure website, portal, or community to manage their vault of gift-cards and initiate trades with other members through the app or through a suitable web-browser as variously seen in FIGS. 10D-10F. Once an agreement or trade has been agreed-upon by two members, a transfer process securely copies (or moves) a first selected gift card from a first member's vault into a second member's vault. Once the copy is verified as having been completed successfully, the first selected gift card may be removed from the first member's vault and a reciprocal process for transferring the second gift card from the second member's vault into the first member's vault may then be effected. Alternatively, the copying of both the first and second gift cards may be effected contemporaneously.

The smart wallet is not actually indispensably needed until a member wants to redeem a transferred gift card or capture the magnetic strip of another gift card. A member, seeking to redeem their gift card, connects their smart wallet to the online cloud community to retrieve the gift card from the vault. Authentication measures may be employed to ensure that the proper members and their corresponding smart wallet are securely coupled to their vault. The cloud community then initiates transfer of a selected gift card in the vault to the smart wallet either automatically or responsive to a user's selection. The smart wallet may then be employed to program the reconfigurable transaction card with the contents of the selected gift card and the reconfigurable transaction card may then be used at a vendor seamlessly in the same manner as an original traditional gift card.

Figure 11:
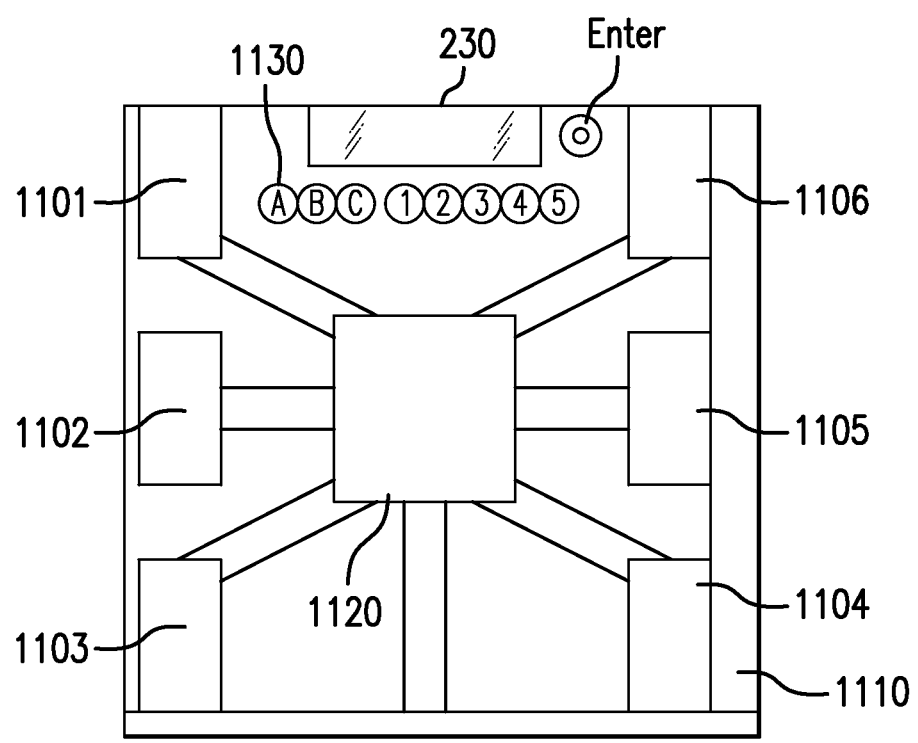
FIG. 11 is another block diagram illustrating an exemplary embodiment of a smart reconfigurable transaction card in accordance with certain aspects of the present invention.

As seen in FIG. 11, a reconfigurable multiple-account transaction card is provided. The reconfigurable transaction card 1100 has a display screen 230 with a user input mechanism 1130. A shared centralized memory 1120 may store a plurality of account identifiers, account information, user names, expiration dates, and the like, and a plurality of near field communication (NFC) or RFID transponder chips 1101-1106 are provided. In this embodiment, each chip 1101-1106 may be encoded to be able to initiate an NFC transfer.

In this event, each chip may transmit an account identifier that was securely stored in memory 1120 through means of a swiping metallic strip 1110. Such strip may read a standard single-use transaction card and store the account information and other information into the memory 1120. The account identifier and other information stored from the single-use transaction card may then be used to transmit through a given chip 1101-1106 to a no-contact near field communication (NFC) transaction station, such as a point of sale machine.

Alternatively, each individual chip 1101-1106 may have a hardware address, potentially a MAC (media access control) address, unique ID (UID), or serial number stamped thereon and permanently encoded therein. A user of the reconfigurable smart transaction card may be able to call a credit provider such as VISA, MASTERCARD, AMERICAN EXPRESS, or the like, and associate a MAC address or Serial Number of a given chip 1101-1106 with an account identifier. Thereby, the chip Serial Number, MAC, or UID address may be scanned at a point of sale terminal and may be sent to a credit processor, such as VISA, MASTERCARD, or AMERICAN EXPRESS, which they may be able to correlate with an account identifier for a given user's transaction card.

Figure 12:
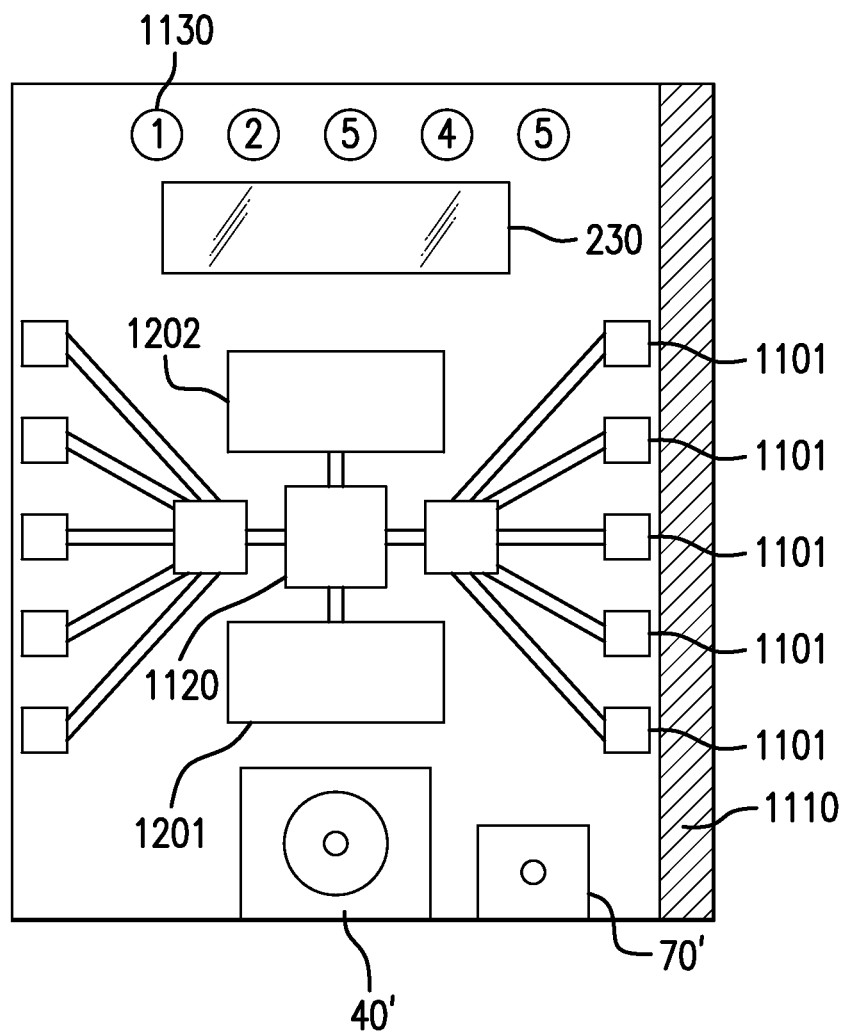
FIG. 12 is another block diagram illustrating an exemplary embodiment of the reconfigurable transaction card in accordance with certain embodiments of the present invention.

As seen in FIG. 12, a further example of a reconfigurable transaction card 1200 is provided. User input mechanism 1130 is provided which may be a touchpad, or a plurality of mechanical buttons such as numerals 1-9. Alternatively, merely 1-5 may be provided to select a top five most frequently used cards. A user may actuate user input mechanism 1130 to thereby select a stored value or account identifier stored within the data storage 1120.

A display screen 230 may then show a corresponding account indicia signaling visually to a user which account identifier is being used. A plurality of chips 1101 may each store either an account identifier, or may have a MAC address which is associated with an account identifier. A biometric fingerprint scanner 40' and a retinal scanner 70' are provided. Alternatively, a password may be required to initiate the card or wallet. Such password may be entered through user mechanism 1130.

Additionally, a fraud prevention chip or security chip 1201 may control the user authentication and locking/unlocking/recovery and such other security features, as would be known to one of skill in the art. Security chip 1201 may also be actuated to encrypt, decrypt, or hash account numbers and other information.

A data networking chip 1202 provides a network access via a data communications network such as a 1×RTT, 2G, EDGE, UMTS, 3G, 4G, WIFI, or other such suitable means as would be known to one of skill in the art. Additionally, the data interface or networking chip 1202 may interface through a USB or other such cable to a general purpose digital computer to piggyback or tether onto the general purpose digital computer's internet connection for communication with card issuers or the smart wallet community. In such manner, the smart wallet may also be employed as a secure personal repository to mediate online purchases on itself or another machine such as a computer or a smart phone (for example, an IOS, ANDROID, WP8, or the like). The smart wallet may be operationally coupled with another computer or smartphone or may merely use its own internet connection and be entrusted with securely storing personal information such as name, account number, billing address, usernames, passwords, and the like. The personal information stored therein may be retrieved to automatically (such as by the swiping of the reconfigurable transaction card or by biometric authentication) and used to securely populate fields in an online transaction form such as a web-purchase page to initiate that transaction. Upon auto-population, a dialog box may pop up to prompt the user to verify the populated fields, for example, as such: "Is the billing address correct?" or "Is the shipping address correct?—please confirm by clicking the 'ok' button." A user may employ a mouse, touchscreen, keyboard, speech to text, or the like to confirm or manually correct information. Additional security may be built in such as requiring a fingerprint, iris, voice authorization, or the like to actually complete the transaction.

In an illustrative example, a smart wallet user may employ a public computer to enact a purchase through a vendor's website. Rather than enter sensitive personal and payment information manually—potentially exposing the user to a keylogger, man in the middle, temporary storage/caching vulnerability, or the like, the user may operationally couple the smart wallet with the computer, such as, through a USB port, BLUETOOTH, WiFi, infrared, NFC, or the like and execute the device to securely transmit personal/payment information stored therein to the fields on the purchase page of the computer or the personal information may be securely transmitted directly to the vendor.

Further integration with online banking, accounting, corporate billing, or tax services, and the like may be provided as well. Purchases made with the reconfigurable transaction card may be tabulated locally to be uploaded, synchronized, and compared to online banking statements through automated means to reduce fraudulent or erroneous charges. Receipts may be generated or captured at the point of sale and automatically uploaded, synchronized, and submitted to corporate accounting, billing, or accounts-payable departments. Designated purchases may be marked as certain tax-deductable expenses or other favorable categories for import into tax programs such as TURBO TAX (R), and the like.

Additionally, use of the smart wallet may enable transfers or payments to be received from third parties. The smart wallet may be employed as a card reader device coupled with a point of sale application in the smart wallet, reader device, or smart phone suitably programmed to ensure security of both parties to the transaction.

Figure 13A:
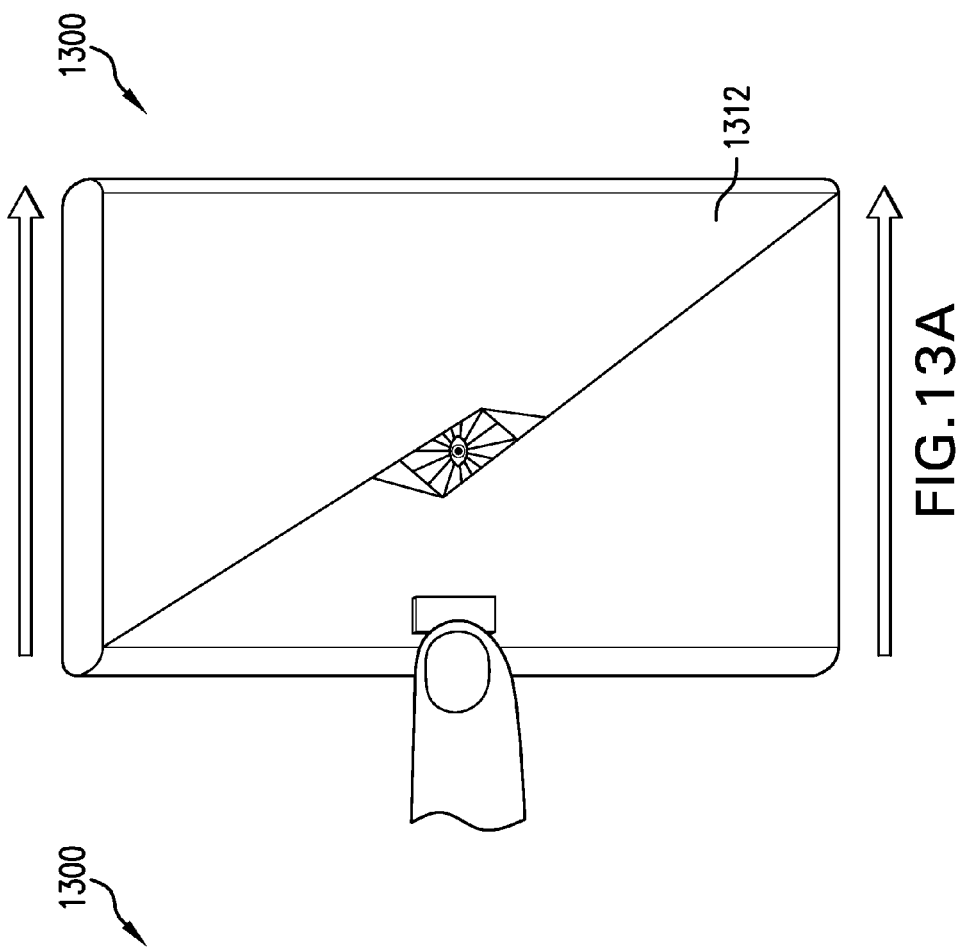
FIGS. 13A-13C show various other configurations of the exemplary smart wallet as illustrated in FIG. 13.
Figure 13:
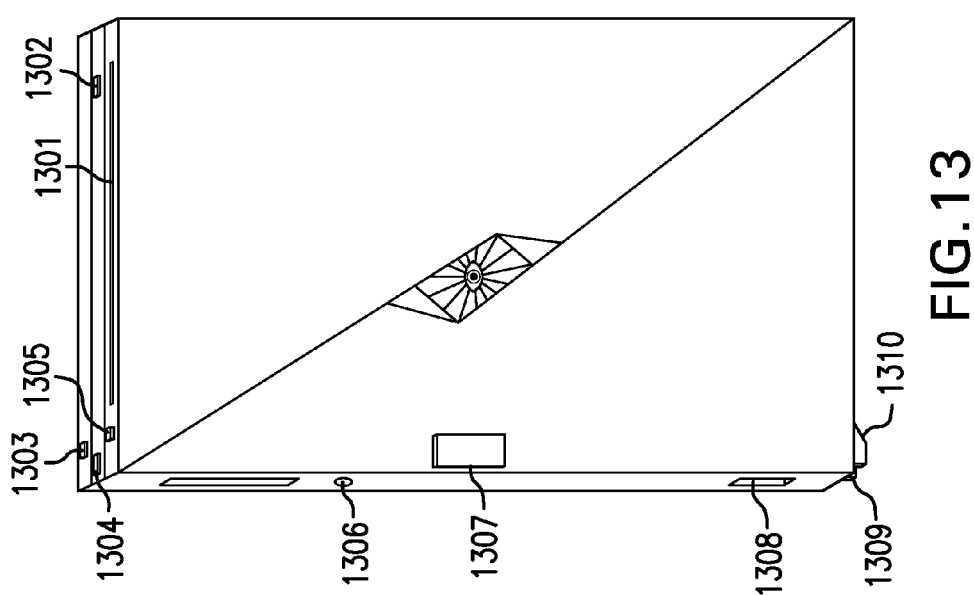
FIG. 13 illustrates a smart wallet in accordance with one exemplary embodiment of the present invention.

FIG. 13 illustrates one example of a smart wallet implementation in accordance with an alternate embodiment of the present invention. Smart wallet 1300 includes in this embodiment an outer exterior jacket 1330. The jacket portion may shield or protect the inner components thereof. A license holding slot or tray 1301 may be provided to securely receive such visual identification which may not lend well to copying and storing in the smart wallet's internal memory. For example, a State Driver's License having a hologram, a US passport card, and other such visually verifiable identification may be retained in the license holder slot 1301.

A rechargeable battery 1304 is coupled to or disposed in the smart wallet or contained within the jacket. A cash holder or paper currency holding tray, drawer, or receiving chamber 1303 may also be provided. A driver's license release button 1305 may automatically eject a license holder contained within the license holder slot 1301. An alternating current (AC) adaptor port 1306 is provided to receive DC or direct current power from a step down transformer and diode coupled to an AC power outlet within a house, office, or place of business. The transformer and diode may take the 110 V AC down to a 12V or 5V direct current DC power source to supply to the smart wallet 1300.

A rubber bumper 1307 or other such compressive elastic type device is provided to soften impacts and/or bias the jacket into certain configurations. A USB port 1308 is additionally provided to take direct current power generally approximately 5V RMS from a computer or other such USB enabled device. Such USB may approach 1000 milliamps of current draw from the computer. Additionally, USB port 1308 may enable communications with a computer for uploading and or downloading information therefrom/thereto.

Another receiving chamber 1310 is preferably provided to store a plurality of other cards, such as backup cards or other cards which may have been unreadable to the magnetic reader. A slot release button 1309 may actuate a tray which releases the stored cards.

FIG. 13A shows a user finger actuating a jacket cover 1312 portion of the jacket 1330 of the smart wallet 1300. FIG. 13B shows a further stage in the progress of an opening where the jacket cover portion 1312 of the smart wallet 1300' is being further displaced in a rightward direction, thereby providing access to a keyboard or other user input device 1311.

Figure 13C:
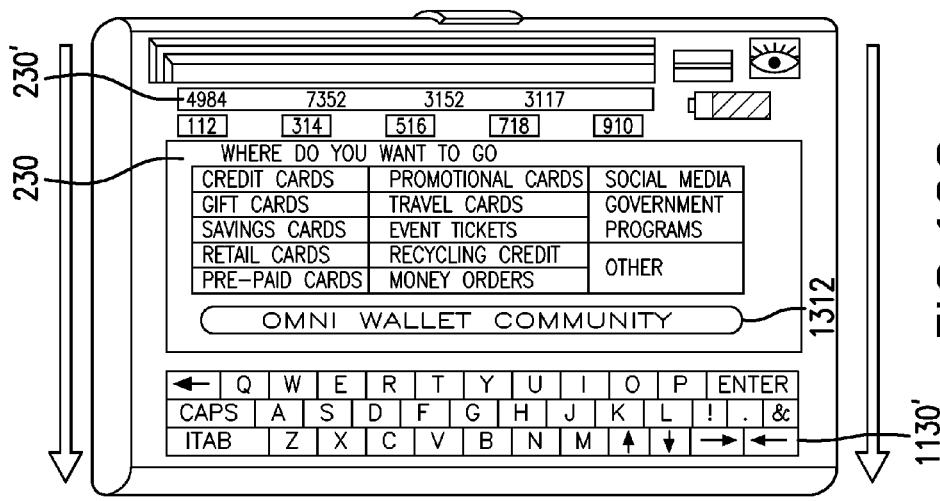
Figure 13B:
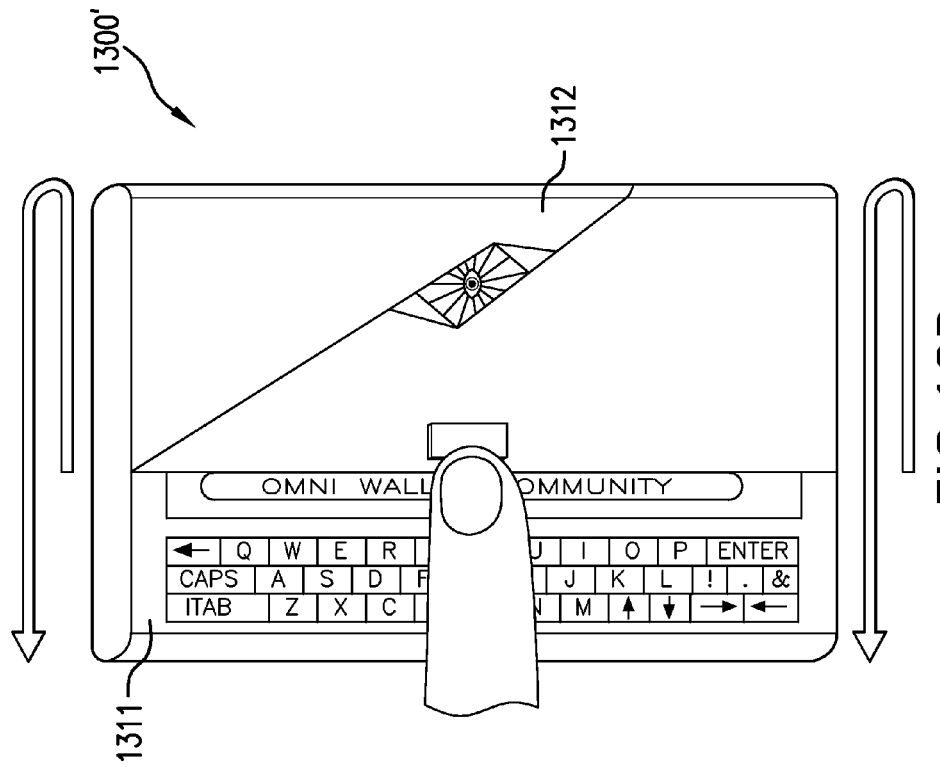

FIG. 13C shows a further progression and completion of the displacement of jacket cover 1312 which thereby enables or provides access to a primary display 230 and a supplemental display 230' as well as a one touch navigation 1313 which may allow a user direct access to any of certain predefined functions. Additionally, an alphanumeric keyboard 1130' may be provided as well. In a preferred embodiment, the smart wallet 1300 may be configured to have one side of length approximately 4.5" long with a width of 2.75" wide and a depth of 0.75" to 9" to thereby securely accept the ISO defined credit card and driver's license sizes.

Figure 14:
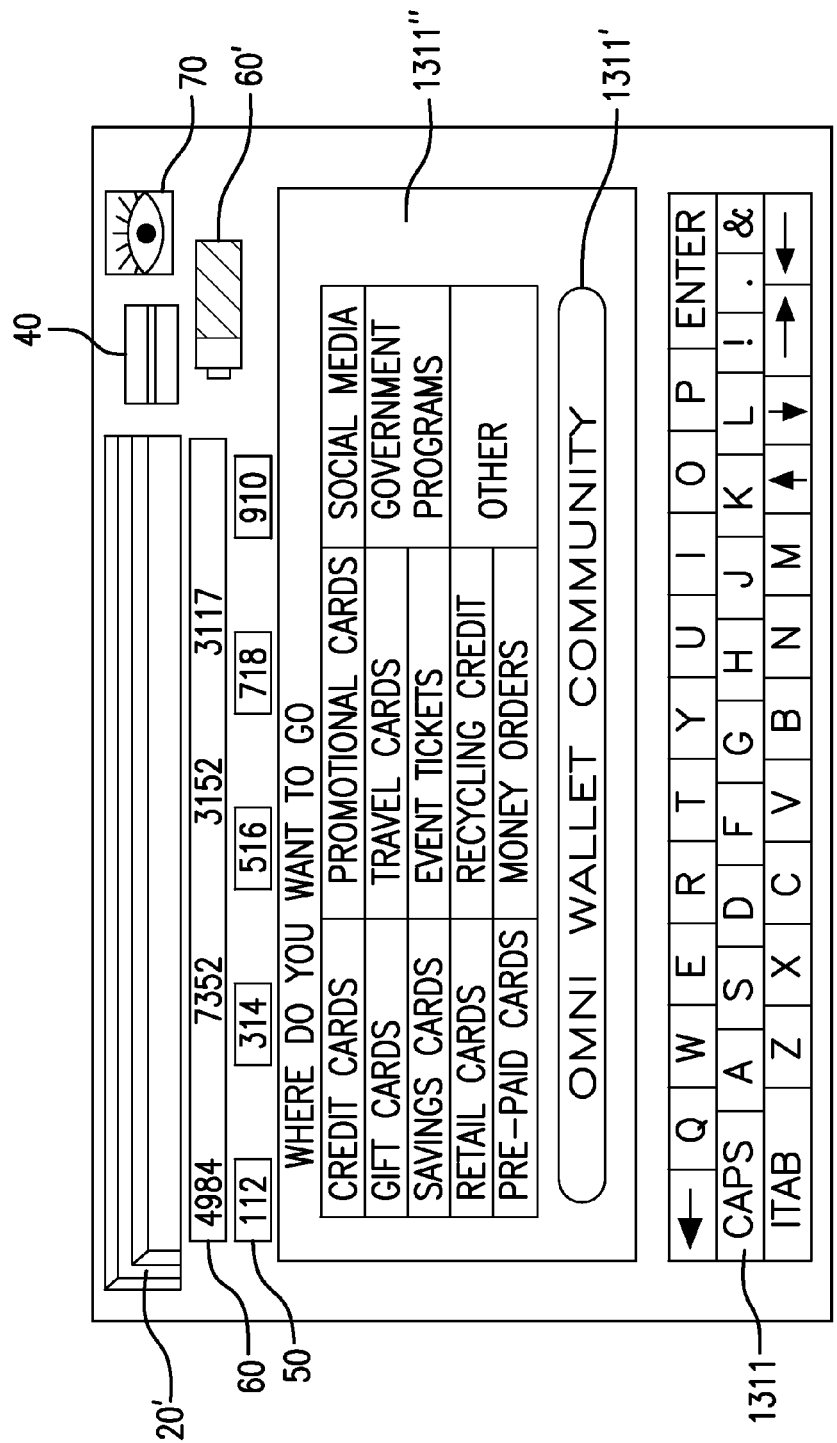
FIG. 14 illustrates an exemplary user interface of a smart wallet in accordance with certain embodiments of the present invention.

As seen in FIG. 14, a perspective view of the opened configuration as seen in FIG. 13C of the smart wallet 1300 is shown. It is seen that a card interface unit 20' or at least a card reader may be provided. A primary display screen 60 is also provided. A numeric user interface 50 is provided along with a keyboard 1311 and a shortcut 1311' for quickly accessing a smart wallet or omni wallet community (discussed above) may be provided. A plurality of shortcuts 1311" may also be provided for the user allowing an almost instantaneous access to credit cards, gift cards, savings cards, retail cards, prepaid cards, promotional cards, travel cards, event tickets, recycling credits, money orders, social media, government programs such as, for example, food stamps, and other such government programs, and other functions. Additionally, a battery indicator 60' may be provided which shows a current state of the battery, such as for example 100% or 80%. A fingerprint reader 40 may be provided as well as a retinal scanner 70.

Figure 15:
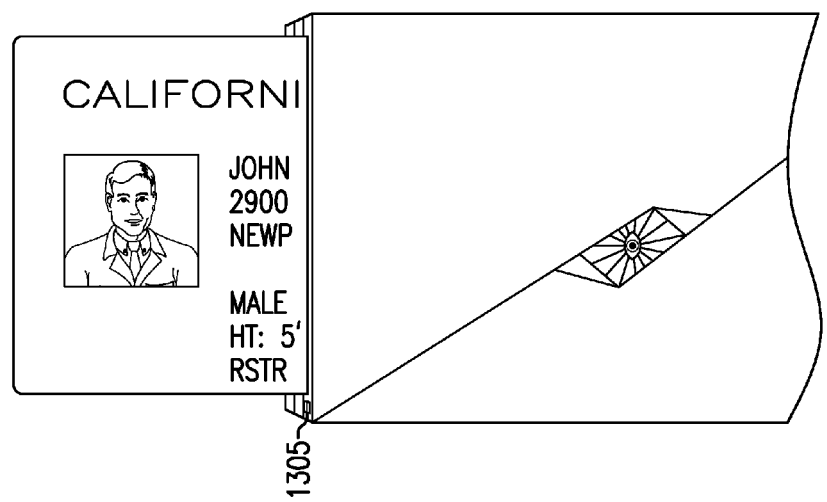

FIG. 15 shows a license receiving slot containing an exemplary driver's license and a quick eject button 1305 to release the license.

Figure 16:
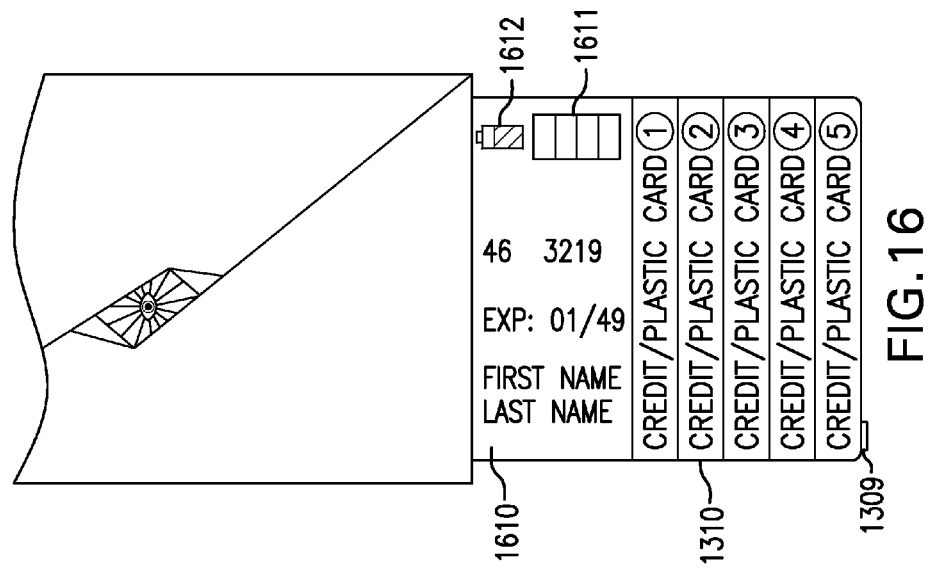
FIGS. 15-16 show various reconfigurations of the exemplary smart wallet of FIG. 13 in accordance with certain embodiments of the present invention.

As seen in FIG. 16, another card release button 1309 has been actuated to release a plurality of credit or plastic single-use transaction cards, as well as the reconfigurable smart transaction card 1610. The cards may be contained on a sleeve which may intercouple with the cards to provide power and/or data to each one. Also, a battery indicator 1612 is provided.

Figure 17:
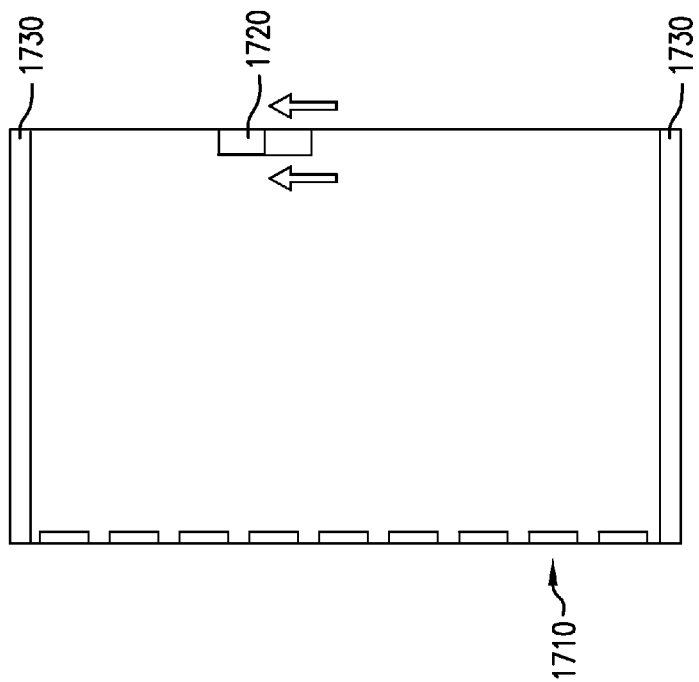
FIG. 17 illustrates a back side of the exemplary embodiment of the smart wallet in accordance with FIG. 13.

As seen in FIG. 17, a rear view of the smart wallet is shown. A sliding button 1720 allows for a back portion to open to reveal a storage compartment therein. A hinged back 1710 allows for the door to swing open. Additionally, a sliding track 1730 is provided for the front protective cover of the jacket to transition or slide.

Figure 18:
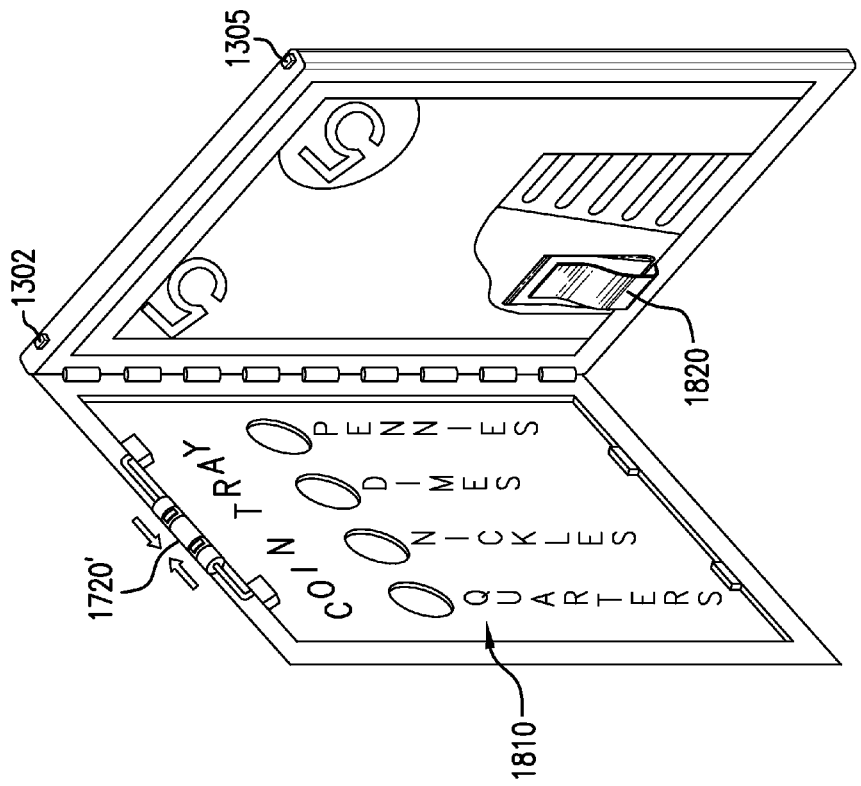
FIG. 18 illustrates a rear storage compartment of an exemplary smart wallet in accordance with certain aspects of the present invention; and, FIG. 19 is a schematic diagram illustrating an exemplary reconfigurable transaction card in accordance with certain embodiments of the present invention.

As seen in FIG. 18, the sliding button has opened the rear door, exposing a removable coin tray 1810 and a money clip 1820. However, anything may be stored in the storage compartment. Additionally, a battery release 1302 is provided for disconnecting the battery. Lastly, a driver's license release button 1305 is also provided for ejecting the driver's license.

An alternative embodiment of the smart wallet and reconfigurable transaction proxy card employs a smart phone for certain functionalities. The Smart wallet has a card interface unit which may include at least one of a magnetic read head, read and write head, near field communication (NFC) transceiver, BLUETOOTH transceiver, smart card pads, and the like. A user interface portion allows a user to initiate various functions within the smart wallet device. A display allows for display of account information and secondary account information such as card-holder name, zip code, pin, expiration date, card verification security codes, and the like. A tip ring sleeve (TRS) connector is provided to interface with a smartphone via its headphone port to send/receive data thereto for display and/or manipulation on its display and/or draw power from the smartphone.

In such manner, smart wallet may leverage existing capabilities of the smartphone such as processing power, network connection, user authentication, battery power, NFC/bluetooth/wifi transceivers, user interface, and the like. Preferably however, components to effect such capabilities are incorporated directly into the smart wallet device itself. TRS connector may alternatively be a usb on the go (USB OTG), HDMI, mobile high-definition link (MHL), or other similar type connector suitable to interface the smart wallet with an external host capable of providing power and/or services. Such connector may be retractable through a sliding mechanism to securely house the connector within the smart wallet body. Alternatively, a female connector portion may allow a user to couple the smart wallet with the smart phone via a replaceable cable.

A user may swipe a traditional predetermined transaction card through the card interface unit of the smart wallet body. The smart wallet reads the transaction card and captures the contents thereof which may include the account identifier and secondary account information related to the account identifier. The contents of the transaction card may be stored in a secure storage memory within the smart wallet, such as a micro secure digital high capacity (SDHC) card releasably stored within a memory card reader/writer. The account identifier and/or the secondary account information may then be displayed on a display where a user may confirm or delete through actuation of a user interface. A memory card may ferry the card contents (preferably in encrypted form) to any of the smart wallet, smartphone, or reconfigurable transaction proxy card. The card contents are thereby transferable between portions (the smartphone is preferably provided with a memory card reader and the reconfigurable transaction proxy card is also preferably provided with a memory card reader). Alternatively, the smart wallet may employ NFC, bluetooth, or wireless radiating field to encode the card contents and provide them to the reconfigurable transaction proxy card or the smartphone. The wireless radiating field may be induced via card interface unit such that the electromagnetic field may directly encode and radiate through an almost direct contiguous contact with transaction card interface unit of the proxy card to thereby save power and ensure heightened security.

The reconfigurable transaction proxy card receives the card contents including at least an account identifier and also secondary account information via any of the measures described above (wireless, inductive contact, memory card, and the like). Secondary account information is then displayed on the display which is preferably an electronic ink (e-ink) display. The user interface allows a user to selectively retrieve at least one of a plurality of different stored transaction card contents within the memory for display and encoding through the card encoding portion/transaction card interface which may be a solenoid or coil and preferably disposed in a racetrack configuration spanning the longitudinal length of the card face occupying at least one ISO defined track. Card encoding portion receives an electrical energy from a battery disposed within the proxy card. The battery is preferably a lithium polymer battery of very small width.

The card encoding portion then radiates an electromagnetic field to thereby encode, through modulation of the field, captured transaction card contents retrieved from memory to thereby communicate with a vendor's point of sale (POS) terminal to effect a transaction in a seamless and transparent manner to be substantially indistinguishable from a standard predetermined transaction card transaction.

In various embodiments of the invention, the system may be implemented in the form of software modules or hardware modules or a combination of both. In some embodiments of the invention, the system is implemented as part of a smart wallet social network.

In a software implementation, the smart wallet software includes a plurality of computer executable instructions, to be implemented on a computer system or smart phone. Prior to loading on the computer system, the software may reside as encoded information on a computer-readable tangible medium, such as a magnetic floppy disk, a magnetic tape, CD ROM, DVD ROM, flash memory, network storage location, or any other suitable computer readable medium.

In a hardware implementation, such a system may be implemented in any suitable computer based platform known in the art. For example, the system may include suitable storage media and/or one or more dedicated processors or share one or more processors executing/controlling other functions, wherein the employed processor(s) is programmably configured with processor instructions for performing the functions described herein. Suitable circuits may also be developed to execute certain aspects of these functions.

Thereby, a consumer may be provided with a smart wallet and reconfigurable transaction card.

While the magnetic strip context has been used as exemplary data storage medium for the reconfigurable transaction card, such magnetic strip is but one of numerous applications and medias of the subject system and method. Such reconfigurable card may be used with any type of media, on any type of network, for any type of transaction, or physically embodied card.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation flows or processing steps may be reversed or interposed, all without departing from the spirit or scope of the invention as defined in the appended Claims.

What is claimed is:

1. A portable system for electronically emulating a wallet and account-bearing transactional card contents thereof, comprising:
   a portable wallet body defining at least one compartment;
   at least one proxy card removably stored within said portable wallet body, said proxy card being selectively modified in electronic configuration locally within said portable system selectively emulating each of a plurality of predetermined account bearing transaction cards having externally readable portions respectively encoded with account data corresponding thereto;

a transaction card interface unit disposed within said portable wallet body having a processor and a memory combined therewith, said transaction card interface unit including:

a user interface portion; and, a card encoding portion coupled to said user interface portion, said card encoding portion being actuated responsive to said user interface portion to selectively encode the account data corresponding to at least one of the predetermined account-bearing transaction cards onto said proxy card, said proxy card emulating and being thereby readable in place of the at least one of the predetermined account-bearing transaction cards during respective card transactions therefor.

2. The portable system for electronically emulating the wallet and account-bearing transactional card contents thereof as recited in claim 1, wherein said transaction card interface unit further includes a card decoding portion capturing account data from at least one of said predetermined account-bearing transaction cards.

3. The portable system for electronically emulating the wallet and account-bearing transactional card contents thereof as recited in claim 1, wherein said card encoding portion includes an electromagnetic write head.

4. The portable system for electronically emulating the wallet and account-bearing transactional card contents thereof as recited in claim 1, wherein said proxy card includes a selectively reconfigurable passive magnetic strip, said selectively reconfigurable passive magnetic strip encoding at least one account data corresponding to at least one of the predetermined account-bearing transaction cards thereon.

5. The portable system for electronically emulating the wallet and account-bearing transactional card contents thereof as recited in claim 4, wherein said proxy card further includes a screen displaying at least a portion of the account data.

6. The portable system for electronically emulating the wallet and account-bearing transactional card contents thereof as recited in claim 1, wherein said proxy card further includes an account storage memory coupled to a power source and an inductive interface unit selectively encoding at least one account data corresponding to at least one of said predetermined account-bearing transaction cards and being thereby readable in substantially identical manner as selected ones of the predetermined account-bearing transaction cards.

7. The portable system for electronically emulating the wallet and account-bearing transactional card contents thereof as recited in claim 1, wherein said proxy card is encoded to selectively emulate a credit card.

8. The portable system for electronically emulating the wallet and account-bearing transactional card contents thereof as recited in claim 1, wherein said proxy card is encoded to selectively emulate a gift card.

9. The portable system for electronically emulating the wallet and account-bearing transactional card contents thereof as recited in claim 6, wherein said portable wallet body further includes a near field communications (NFC) portion.

10. The portable system for electronically emulating the wallet and account-bearing transactional card contents thereof as recited in claim 9, wherein said proxy card includes a near field communications (NFC) portion, a display portion, and a user interface portion.

11. The portable system for electronically emulating the wallet and account-bearing transactional card contents thereof as recited in claim 1, further comprising a user authentication portion selectively activating said portable system responsive to detection of a validated user.

12. The portable system for electronically emulating the wallet and account-bearing transactional card contents thereof as recited in claim 1, wherein said transaction card interface unit includes a web browser portion selectively retrieving pre-stored account data and populating information fields in a purchase website page therewith.

13. The portable system for electronically emulating the wallet and account-bearing transactional card contents thereof as recited in claim 8, wherein said proxy card is locally encoded by said card encoding portion with account data received from a remote source for exchange of the emulated gift card between different users.

* * * * *